US007243301B2

(12) United States Patent
Bargeron et al.

(10) Patent No.: US 7,243,301 B2
(45) Date of Patent: Jul. 10, 2007

(54) COMMON ANNOTATION FRAMEWORK

(75) Inventors: David M. Bargeron, Seattle, WA (US); Anoop Gupta, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 10/119,544

(22) Filed: Apr. 10, 2002

(65) Prior Publication Data

US 2004/0205545 A1 Oct. 14, 2004

(51) Int. Cl.
*G06N 3/00* (2006.01)
(52) U.S. Cl. ...................................................... 715/512
(58) Field of Classification Search ................ 715/500, 715/512, 511, 513, 517, 523, 530
See application file for complete search history.

(56) References Cited

U.S. PATENT DOCUMENTS

| | | | |
|---|---|---|---|
| 4,649,499 A | 3/1987 | Sutton et al. | |
| 5,333,266 A | 7/1994 | Boaz et al. | |
| 5,524,193 A | 6/1996 | Covington et al. | |
| 5,526,407 A | 6/1996 | Russell et al. | |
| 5,572,643 A | 11/1996 | Judson | |
| 5,583,980 A | 12/1996 | Anderson | |
| 5,600,775 A * | 2/1997 | King et al. ................. | 715/500 |
| 5,633,916 A | 5/1997 | Goldhagen et al. | |
| 5,699,089 A | 12/1997 | Murray | |
| 5,732,216 A * | 3/1998 | Logan et al. ............... | 709/203 |
| 5,809,250 A | 9/1998 | Kisor | |
| 5,838,313 A | 11/1998 | Hou et al. | |
| 5,893,087 A | 4/1999 | Wlaschin et al. | |
| 5,893,110 A | 4/1999 | Weber et al. | |
| 5,903,892 A | 5/1999 | Hoffert et al. | |
| 5,923,848 A | 7/1999 | Goodhand et al. | |
| 5,969,716 A | 10/1999 | Davis et al. | |
| 5,991,365 A | 11/1999 | Pizano et al. | |
| 6,006,241 A | 12/1999 | Purnaveja et al. | |
| 6,009,462 A | 12/1999 | Birrell et al. | |
| 6,081,829 A | 6/2000 | Sidana | |
| 6,085,185 A | 7/2000 | Matsuzawa et al. | |

(Continued)

FOREIGN PATENT DOCUMENTS

EP 0560126 4/1995

(Continued)

OTHER PUBLICATIONS

Rui, et al; "Constructing Table-of-Content for Videos"; ACM Multimedia Systems Journal, Special Issue Multimedia Systems on Video Libraries; vol. 7, No. 5; Sep. 1999; pp. 359-368.

(Continued)

*Primary Examiner*—Stephen Hong
*Assistant Examiner*—Kyle R. Stork
(74) *Attorney, Agent, or Firm*—Perkins Coie LLP

(57) ABSTRACT

A Common Annotation Framework includes, in an embodiment, an annotation having a context anchor that identifies a resource and a position in the resource that the annotation pertains to, and a content anchor that identifies data that is annotating the resource. The annotation can also be extended with client application-defined data and/or functionality, and the framework can be extended with one or more of application-defined objects, methods, and annotation stores.

45 Claims, 13 Drawing Sheets

U.S. PATENT DOCUMENTS

| | | | |
|---|---|---|---|
| 6,105,055 | A | 8/2000 | Pizano et al. |
| 6,173,287 | B1* | 1/2001 | Eberman et al. ............. 707/102 |
| 6,173,317 | B1 | 1/2001 | Chaddha et al. |
| 6,230,172 | B1 | 5/2001 | Purnaveja et al. |
| 6,289,362 | B1* | 9/2001 | Van Der Meer ......... 715/501.1 |
| 6,311,189 | B1 | 10/2001 | deVries et al. |
| 6,317,141 | B1 | 11/2001 | Pavely et al. |
| 6,332,144 | B1 | 12/2001 | deVries et al. |
| 6,360,234 | B2 | 3/2002 | Jain et al. |
| 6,366,296 | B1 | 4/2002 | Boreczky et al. |
| 6,438,566 | B1 | 8/2002 | Okuno et al. |
| 6,449,653 | B2 | 9/2002 | Klemets et al. |
| 6,452,615 | B1 | 9/2002 | Chiu et al. |
| 6,484,156 | B1 | 11/2002 | Gupta et al. |
| 6,571,295 | B1* | 5/2003 | Sidana ........................ 709/246 |
| 6,584,478 | B1 | 6/2003 | Spertus |
| 6,599,241 | B1* | 7/2003 | Murphy ...................... 600/300 |
| 2002/0054059 | A1* | 5/2002 | Schneiderman ............. 345/700 |

FOREIGN PATENT DOCUMENTS

| | | |
|---|---|---|
| GB | 2301260 | 11/1996 |
| WO | WO9749251 | 12/1997 |

OTHER PUBLICATIONS

Marshall; "Annotation: from paper books to the digital library"; Proc. of Digital Libraries '97; (Philadelphia, PA, Jul. 1997) pp. 131-140.

Cadiz, et al.; "Using Web Annotations for Asynchronous Collaboration Around Documents"; Proc. of CSCW '00; (Philadelphia, PA, Dec. 2000); pp. 309-318.

Gronbaek, et al.; "Webvise: Browser and Proxy Support for Open Hypermedia Structuring Mechanisms on the WWW"; Proc. of the Fifth International World Wide Web Conference; (Toronto, May 1999); pp. 253-268.

Wilcox, et al.; "Dynomite: A Dynamically Organized Ink and Audio Notebook"; Proc. of CHI '97; (Atlanta, Georgia, Mar. 1997); pp. 186-193.

Laliberte, et al.; "A Protocol for Scalable Group and Public Annotations"; 1997 NCSA Technical Proposal; http://www.hypernews.org/$^{18}$liberte/www/scalable-annotations.html.

Davis, et al; "NotePals: Lightweight Note Sharing by the Group, for the Group"; Proceedings of Human Factors in Computer Systems: CHI 99; Pittsburgh, PA; May 15-20, 1999; p. 338-345.

Carrer, et al; "An Annotation Engine for Supporting Video Database Population"; Multimedia Tools and Applications 5; 1997; Lkuwer Academic Publishers; pp. 223-258.

"Webster's Encyclopedic Unabridged Dictionary of the English Language"; 1989; Portland House; 3 pages.

Chen, et al.; "(1996) Video and Audio: Organization and Retreival in the WWW"; WhitePaper, Available at http://vosaic.com/corp/papers/www5.html; Archived Jan. 28, 1998.

"Synchronized Multimedia Integration Language (SMIL) 1.0 Specification;" W3C Recommendation; Jun. 15, 1998; http://www.w3.org/TR/1998/REC-SMIL-19980615.

Nerney; "RealNetworks unveils software line for Multimedia displays"; Network World; May 4, 1998; http://www.nwfusion.com/news/0504real.html. 2 pages.

Booker; "Microsoft and RealNetworks Wage Media War"; InternetWeek; Jul. 10, 1998; http://www.techweb.com/wire/story/TWB 19980710S0014. 2 pages.

Moseley, et al.; Microsoft Office 97, 2nd Ed.; Sybex Inc., 1997, pp. 756-763 and 812-816.

Neuwirth et al.; "Computer Support for Distributed Collaborative Writing: Defining Parameters of Interaction"; Proceedings of CSCW '94; Chapel Hill, NC, 1994; pp. 145-152.

Stanford Online; "Masters in Electrical Engineering"; http://scpd.standford.edu/ce/telecom/onlinedegree.html, 4 pages, printed Nov. 3, 2000.

Weber, et al.; "Marquee: A Tool For Real-Time Video Logging"; Proceeding of CHI '94; Boston, MA; Apr. 1994; ACM Press; pp. 58-64.

WEI, "Media Weaver-A Distributed Media Authoring System for Networked Scholarly Workspace"; Multimedia Tools and Applications; Jun. 2, 1997; Stanford University; pp. 1-21.

Roscheisen, et al; "Beyond Browsing: Shared Comments, SOAPs, Trails and On-Line Communities"; Computer Networks and ISON Systems 27 (1995); pp. 739-749.

Gould, et al; "Relativity Controller: Reflecting User Perspective in Document Spaces"; Adjunct Proceedings of INTERCHI '93; ACM Press; pp. 125-126.

Kim, et al; "VIRON: An Annotation-Based Video Information Retrieval System"; Proceedings of COMPSAC '96; Seoul, South Korea; Aug. 1996; IEEE Press; pp. 298-303.

"Third Voice Rips Holes in Web"; Story Location: http://wired./com/news/technology/0,1282,20636.html.; Jul. 9, 1999.

Lawton, et al; "The Knowledge Weasel Hypermedia Annotation System"; Proceedings of the Hypertext 93; Nov. 1993; ACM Press; pp. 107-117.

Lee, et al.; "Video Indexing-An Approach Based on Moving Object and Track"; Proceedings of the SPIE; vol. 1908; 1993; pp. 25-36.

Marshall; "Toward and ecology of hypertext annotation"; Proceedings of the Hypertext; Pittsburgh, PA; Jun. 1998; ACM Press; pp. 40-48.

Abowd, et al.; "Teaching and Learning as Multimedia Authoring: The Classroom 2000 Project"; Proceedings of the Multimedia '96; Boston MA; Nov. 1996; ACM Press; pp. 187-198.

Bessler, et al.; "DIANE: A Multimedia Annotation System"; Proceedings of the ECMAST '97; Milan Italy; May 1997; 16 pages.

Ovsiannikov, et al.; "Annotation Technology"; International Journal of Human Computer Studies; Apr. 1999; vol. 50; No. 4; pp. 329-362.

Calfonte, et al.; "Expressive Richness: A Comparison of Speech and Text as Media for Revision"; Proceedings of the CHI '91; ACM Press; pp. 21-26; 1991.

Davis, et al.; "CoNote System Overview"; 1995; 3 pages; Available at http://www.cs.cornell.edu/home/dph/annotation/annotations.html.

Gaines, et al.; "Open Architecture Multimedia Documents"; Proceedings of the Multimedia '93; Anaheim CA; Aug. 1993; ACM Press; pp. 137-146.

Pizano, et al.; "Integrated Multimedia Messaging Concepts and Applications"; Proceedings of the 1996 ACM Symposium on Applied Computing; Philadelpha, Pennsylvania; ACM Press; pp. 12-16; 1996.

Lee, et al.; "Storage and Retrieval for Image and Video Databases"; Proceedings SPIE- The International Society for Optical Engineering; San Jose, CA; Feb. 2-3, 1993; vol. 1908; pp. 1-36.

Smith; "DynaText: An Electornic Publishing System"; Technical Review; pp. 415-420.

Phelps, et al; "Multivalent Annotations"; Published in Proceedings of the First European Conference on Research and Advanced Technology for Digital Libraries; Sep. 1-3, 1997, Pisa, Italy; 15 pages.

Neuwirth, et al.; "Distributed Collaborative Writing: A Comparison of Spoken and Written Modalities for Reviewing and Revising Documents"; Human Factors in Computing Systems; Apr. 24-38, 1994; Boston, Massachusetts; pp. 51-57.

Roscheisen, et al.; "Shared Web Annotations As a Platform for Third-Party Value-Added Information Providers: Architecture, Protocols, and Usage Examples"; Technical Report CSDTR/DLTR; Stanford University; 33 pages.

Schickler, et al.; "Pan-Browser Support for Annotations and Other Meta-Information on the World Wide Web"; Fifth International World Wide Web Conference; May 6-10, 1996; Paris, France; 14 pages.

Smith, et al.; "What Should a Wildebeest Say? Interactive Nature Films for High School Classrooms"; ACM Multimedia 97-Electronic Proceedings; Nov. 8-14, 1997; Seattle, WA; 18 pages.

Phelps, et al.; "Robust Intra-document Locations"; Proceedings of the 9th World Wide Web Conference; Amsterdam; May 2000; 18 pages.

Wojahn, et al.; "Effects of Interfaces for Annotation on Communication in a Collaborative Task"; CHI Conference Proceedings; Apr. 18-23, 1998; pp. 456-463.

Golovchinsky, et al.; "Moving Markup: Repositioning Freeform Annotations"; Proceedings of the 15th Annual ACM Symposium on User Interface Software and Technology; Oct. 27-30, 2002; Paris France; vol. 4; Issue 2; pp. 21-29.

XML Linking Language (XLink) Version 1.0, W3C Recommendation; Steve DeRose et al., Editors; Jun. 27, 2001; 34 pages.

XML Schema Part 0: Primer, W3C Recommendation; David Fallside, Editor; May 2, 2001; 72 pages.

XML Schema Part 1; Structures, W3C Recommendation; Henry Thompson et al., Editors; May 2, 2001; 198 pages.

XML Schema Part 2: Datatypes, W3C Recommendation; Paul Biron et al., Editors; May 2, 2001; 144 pages.

* cited by examiner

COMMON ANNOTATION FRAMEWORK

TECHNICAL FIELD

This invention relates to annotating content, and particularly to a Common Annotation Framework.

BACKGROUND

A wide variety of content is currently available in digital form via computers, such as articles, papers, and other publications, images, video, audio, combinations thereof, etc. One problem with such content in digital form, however, is that it is difficult to add annotations or notes to the content. For example, a reader of a traditional paper-copy of an article is able to use a pen or pencil to jot down notes in the margins, underline or circle sections of the article, use a highlighter to highlight portions of the article, and so forth.

Some systems have been devised to allow digital content to be annotated. However, such systems are typically tied to, and are specialized for, one particular application. This results in users being required to learn different annotations systems for different applications, which reduces overall user-friendliness of the annotation systems. Thus, it would be beneficial to provide a system which allows users to annotate different types of content and maintain a more consistent user experience.

SUMMARY

A Common Annotation Framework is described herein.

In accordance with one aspect of the framework, an annotation includes a context anchor that identifies both a resource and a position in the resource that the annotation pertains to, and a content anchor that identifies data that is annotating the resource. The annotation can also be extended with client application-defined data in a variety of ways.

BRIEF DESCRIPTION OF THE DRAWINGS

The same numbers are used throughout the document to reference like components and/or features.

DETAILED DESCRIPTION

The Common Annotation Framework described herein provides a basic framework for allowing annotations to be created for a variety of different content types and by a variety of different applications. The framework allows applications to support annotations and further extend the basic framework by adding new properties, objects, methods, etc. as they desire.

Figure 1:
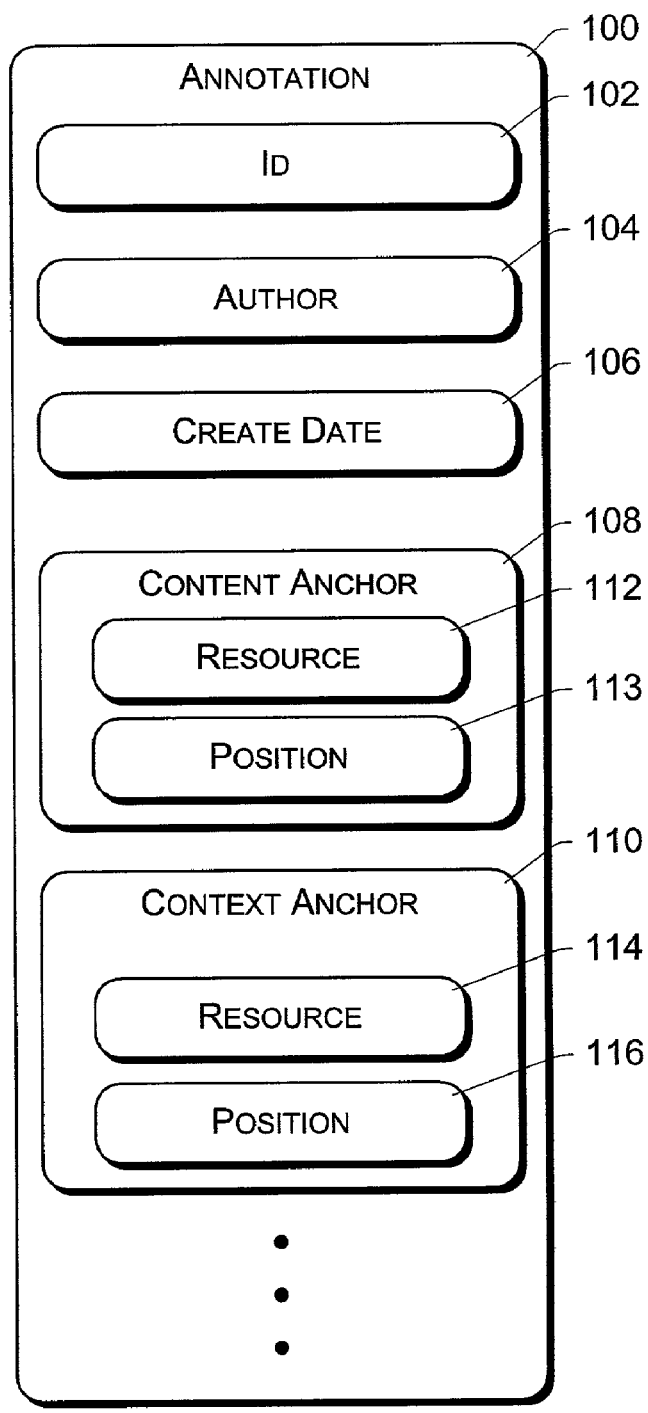
FIG. 1 is a block diagram illustrating a logical model of an exemplary annotation.

FIG. 1 is a block diagram illustrating a logical model of an exemplary annotation. An annotation 100 includes an identifier (id) field 102, an author field 104, a creation date field 106, one or more content anchor fields 108, and one or 19 more context anchor fields 110. Id field 102 contains a unique identifier of annotation 100. This identifier may globally define annotation 100 uniquely (e.g., a GUID (globally unique ID)), or alternatively may locally define annotation 100 uniquely (e.g., a unique identifier within a particular annotation system).

Author field 104 contains an identifier of the author of annotation 100, and creation date field 106 contains an indication of the date (and optionally time) of when the annotation was created. The author may be the author's name or some other identifier of the author (e.g., a user id that is used by the user to log into the computer from which the annotation is created).

Content anchor 108 contains a resource 112 and an optional position 113, and context anchor 110 contains a resource 114 and an optional position 116. As used herein, a "resource" refers to anything that can be annotated or that can serve to annotate something else. A resource may refer to something a user wishes to annotate (e.g., an article he or she is reading), or may refer to the content the user intends to use as part of an annotation (e.g., a comment he or she wants to make regarding the article being read). A resource may be any of a wide variety of content (e.g., alphanumeric text, audio, video, graphics, symbols, etc.) and may be only a portion of a larger piece of content (e.g., a block of text from a larger article, one or two frames of a video or audio/video presentation, etc.). Examples of resources include a simple block of ASCII text, a complex word processing document, an audio/video presentation, a web page, an electronic calendar item, digital ink data (e.g., generated based on the ink API (Application Programming Interface) available from Microsoft Corp. of Redmond, Wash.) or other handwriting recognition process data, and so forth.

In annotation 100, the item being annotated is represented by context anchor 110 and the content doing the annotating is represented by content anchor 108. Annotation 100 is a self-contained representation of the annotation, identifying the content doing the annotating as well as the resource being annotated. Annotation 100 thus serves to define the relationship between two or more resources (the content being annotated and the content that is annotating). Furthermore, by being self-contained, an annotation can be stored separate from the content that is being annotated (and also separate from the content doing the annotating), although an annotation may be stored along with such content (e.g., the content being annotated) if desired for convenience (e.g., portability). Additionally, by having the annotation self-contained, it can readily annotate read-only content (such as publicly-available web pages, streaming video, etc).

Each anchor 108, 110 contains information pertaining to a single resource. The anchor 108, 110 can be "by-reference", in which case the anchor references a resource (e.g., by URL (Uniform Resource Locator) or some other pointer or identifier), or the anchor can be "by-value" and contain a resource literally (e.g., the actual content of the reference).

Context anchor 110 typically includes a position field 116 that contains information about a position in the resource that the anchor 110 pertains to or is associated with. The exact manner in which the position information is included can vary, depending on the client application creating the annotation and the nature of the resource to which the anchor 110 pertains. However, there should typically be sufficient information in the position field to accurately identify (as accurately as the client application desires), where the data doing the annotating is situated. For example, if the resource to which the anchor 110 pertains is text, position field 116 may include a paragraph number for the portion of a text article, a page number and x,y-coordinate location on the page for the resource to which the anchor pertains, etc. Additionally, position field 116 may identify a single location (e.g., a single point on a page) or a range of locations (e.g., a circle or ellipse or other shape, a range of words or symbols, etc.). Position field 116 can also include a codebase identifier so that code can be downloaded by a client application to handle any special processing on the position data itself, for instance in situations where the position data is very complex. Additionally, when a resource is identified "by-reference", the pointer or identifier of the resource can have position information embedded therein (e.g., a URL may include position information). Position field 113, when included in content anchor 108, contains information about a position in the resource that the anchor 108 pertains to or is associated with, analogous to position field 116.

Each of the resource elements 112 and 114 can include a format attribute and a codebase attribute. The format attribute of a resource element identifies the internal structure of the resource, serving as a type identifier for applications. In effect, an application can ask the resource element what kind of data is stored in the resource before the application attempts to parse the data. If the application recognizes the value of the format attribute, then the application can parse the data. If, however, the application does not recognize the format, the application can use the codebase identifier to go out and download code that does understand the resource data. For example, if the resource element were storing digital ink "by value" (e.g. the data is literally stored within the resource element, and is not stored somewhere else), the format attribute could be a value something like "digital ink". By way of another example, if the resource element were storing a resource "by reference" rather than "by value", the resource element's format attribute could be a value something like "text/url" to indicate that the data stored therein is a url that references a resource stored somewhere else. It should be noted that the resource may use some application-defined, or as yet-undefined, addressing scheme, so the format and codebase attributes can be used to allow those addressing schemes to be identified too.

Each of the position fields 113 and 116 can also include a format attribute and a codebase attribute. The format attribute of the position element identifies the internal structure of the position data stored inside the element, and just like with a resource, an application can use the format attribute of the position element to figure out whether the application can understand the position data. For example, if the position data is a literal character offset into a document, such as the integer value 118, then the format attribute of the position element could be a value of something like "characterOffset," which tells the application to interpret the otherwise inscrutable value 118 as a character offset. If the application does not know what to do with "characterOffset", it can use the codebase attribute of the position element to download code that does.

Multiple content anchors 108 can be included in annotation 100, each of which contains information pertaining to a different resource. For example, multiple foreign-language translations of a user's comment can be included in an annotation by having a different content anchor 108 for each translation. Additionally, multiple context anchors 110 can also be included in annotation 100, each of which contains information about a different resource and/or different positions within the same resource. For example, a single annotation may be anchored to different locations in the same document, or to different documents, by including a different context anchor 110 for each resource and/or intra-resource position. Thus, each annotation can be associated with multiple resources, including multiple resources being annotated (as identified in context anchors) and multiple resources doing the annotating (as identified by multiple content anchors).

It should be noted that an annotation 100 can itself be a resource, and thus can be identified as the resource of an anchor (context and/or content) of another annotation.

It should also be noted that additional properties can be added to annotation 100 and/or any of the anchors 108, 110 in order to extend or expand the annotation 100 and/or anchors 108, 110. The ability to add such properties is supported by the Common Annotation Framework but the actual properties themselves (e.g., what type of data they store, what they represent, the structure of data within the properties, etc.) are not defined by the Common Annotation Framework. These additional properties may be defined at design time (e.g., a system designer or g programmer implementing the Common Annotation Framework may choose to add one or more such properties), or may be application-defined (e.g., created by client applications when accessing an implemented Common Annotation Framework). These additional properties can be virtually anything the system designer/programmer or client application desires, such as additional types of data, additional methods for operating on the data, etc.

Each additional property also typically includes a codebase that identifies a location where information on how to process the additional property can be obtained. This information may be descriptive in nature (e.g., laying out a set of steps to be performed by a client application in order to process the additional property), or may include code (e.g., software instructions) that can be copied and invoked by the client application to process the additional property.

In certain implementations, multiple annotations 100 may be grouped together into a single set. A particular set can include multiple annotations 100, and optionally may include additional annotation sets. These sets can be defined by client applications, thereby optionally allowing the user of a client application to define sets.

Figure 2:
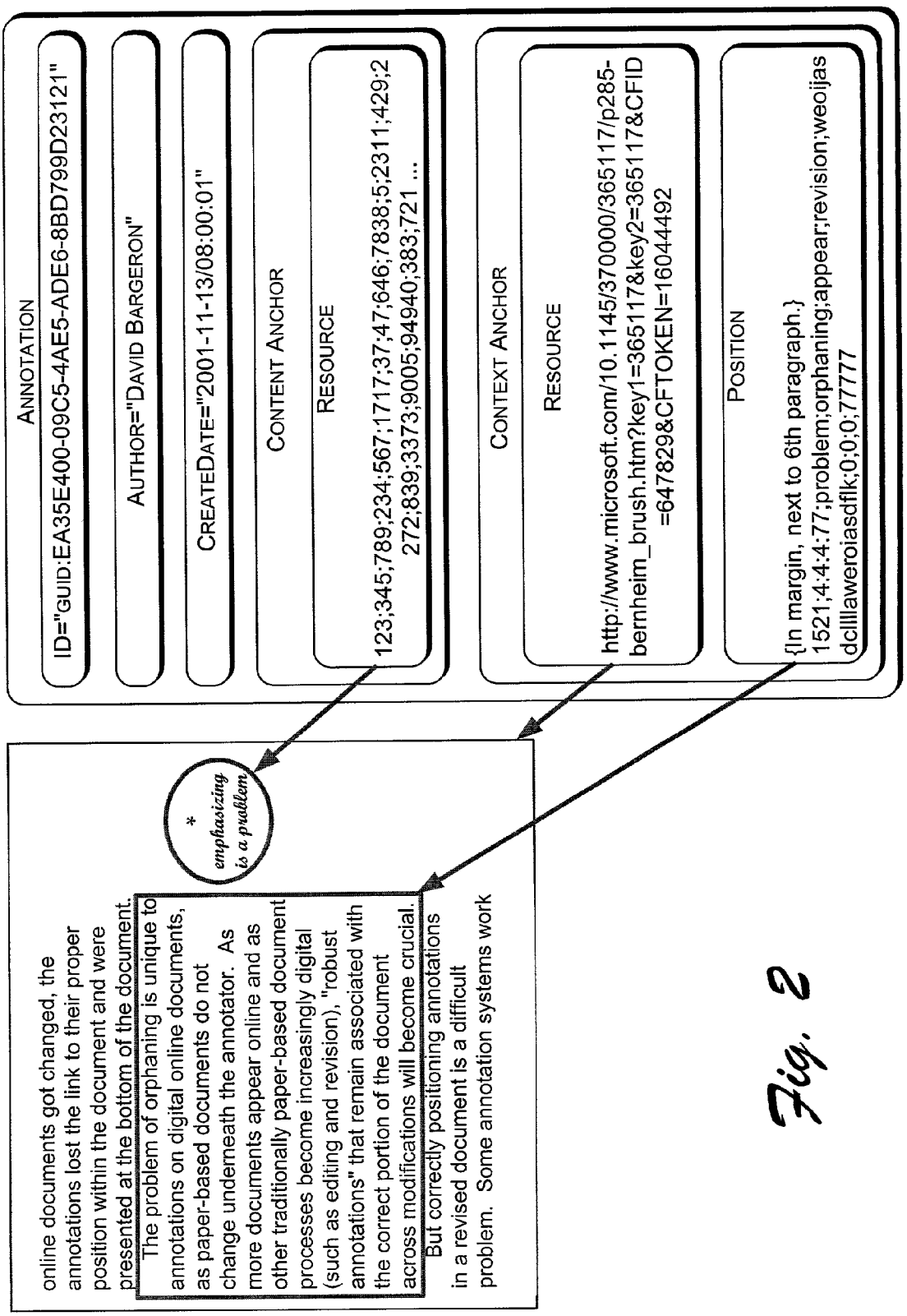
FIG. 2 illustrates an exemplary annotation for a text article.

FIG. 2 illustrates an exemplary annotation for a text article. The annotation includes an identifier field, author field, and creation date field. The annotation also includes a content anchor with a resource field that identifies the data that is doing the annotating (that is, the text "* emphasizing is a problem"). The resource field contains data that literally represents the handwritten text of the annotation (e.g., as digital ink). The annotation further includes a context anchor with a resource field that identifies the article being annotated and a position field that identifies where in the article the annotation occurs (as illustrated, the annotation is associated with the margin area next to the sixth paragraph of the article).

Figure 3:
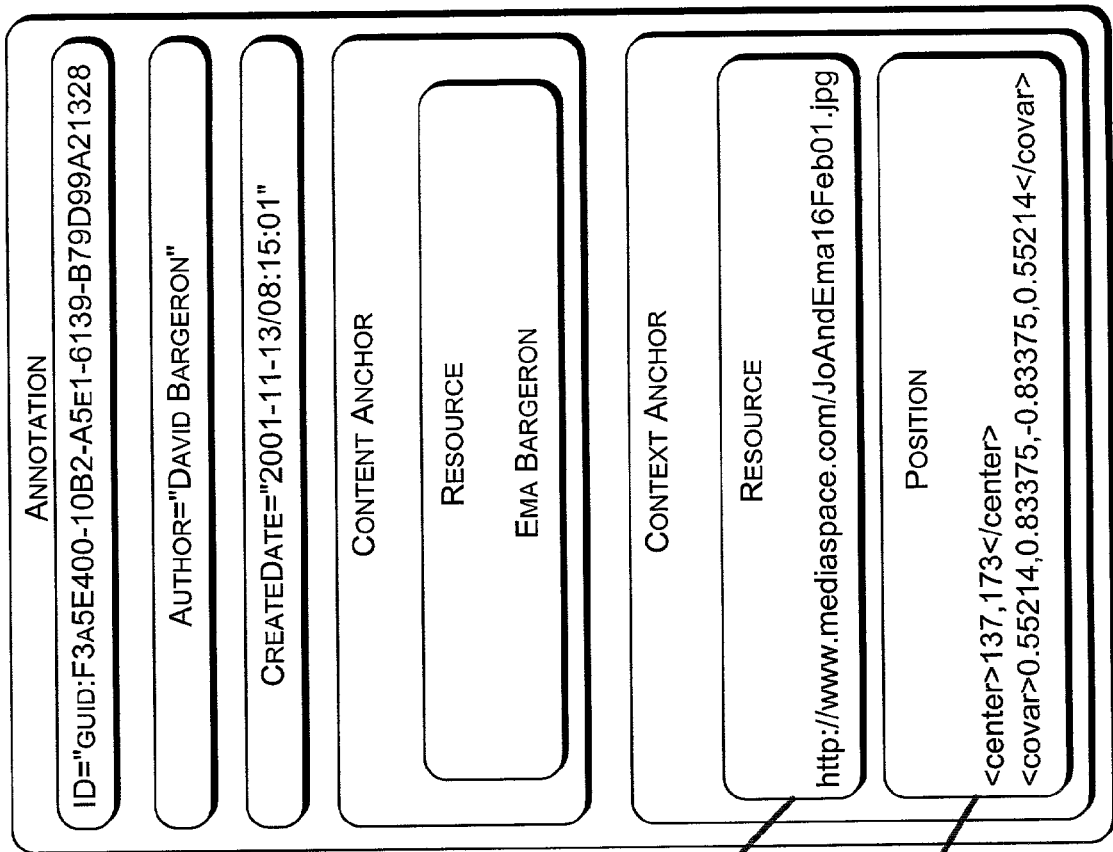
FIG. 3 illustrates another exemplary annotation for image content.
Figure 3:

FIG. 3 illustrates another exemplary annotation for image content. The an annotation includes an identifier field, an author field, and a creation date field. The annotation also includes a content anchor with a resource field that identifies the data that is doing the annotating (that is, the literal text "Ema Bargeron"). The annotation further includes a content anchor with a resource field that identifies the image being annotated and where in the image the annotation occurs (that is, the face of Ema Bargeron).

Figure 4:
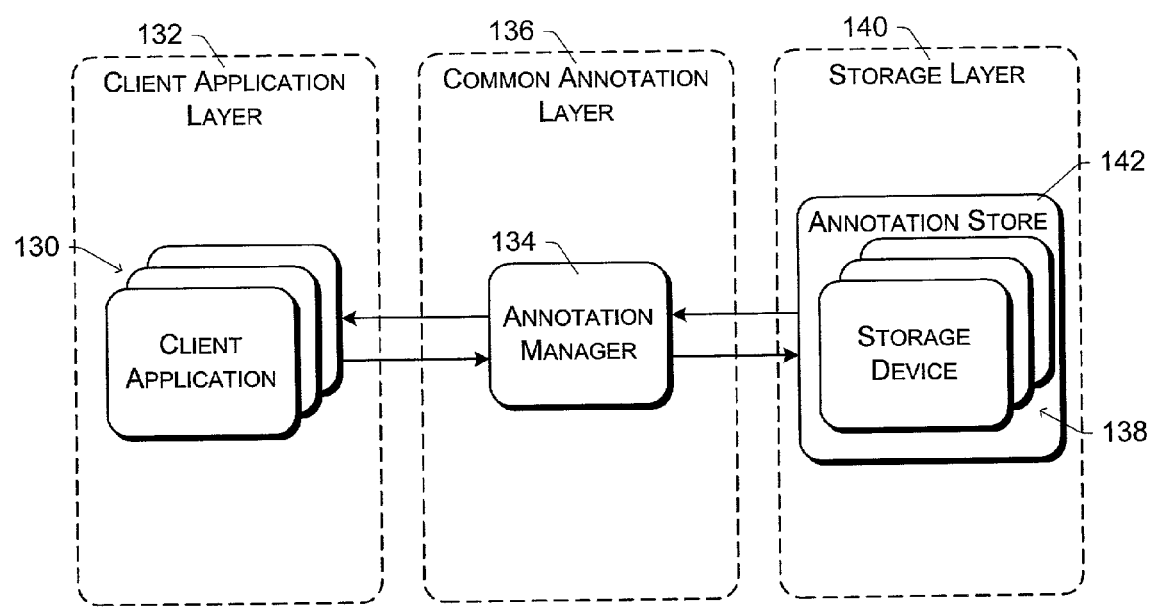
FIG. 4 is a block diagram illustrating an exemplary system employing annotations.

FIG. 4 is a block diagram illustrating an exemplary system employing annotations (e.g., annotations 100 of FIG. 1). In FIG. 4, one or more client 19 applications 130 are part of a client application layer 132. The client applications 130 communicate with an annotation manager 134 in a common annotation layer 136, which in turn communicates with an annotation store 142 in a storage layer 140. When a client application 130 desires to operate on an annotation (e.g., create an annotation, retrieve an annotation, modify an annotation, delete an annotation, etc.), the application 130 communicates the desired request to annotation manager 134, which in turn accesses the annotation store 142 to carry out the requested operation. A client application 130 may decide itself to perform an operation on an annotation (e.g., it may be programmed to retrieve annotations each day that satisfy particular conditions), or may do so in response to a user-request (e.g., the user enters a request, via a user interface used by an application 130, to operate on an annotation).

The various layers 132, 136, and 140 may be implemented on the same computing device or alternatively on different computing devices. Similarly, client applications 130 may exist on the same computing device or alternatively multiple different computing devices. A single annotation manager 134 may interact with multiple client applications (which in turn may be situated on the same computing device as the applications or on a different computing device than one or more of the client applications). Alternatively, a different annotation manager 134 may be implemented for each client application 130.

Annotation store 142 of storage layer 140 is associated with annotation manager 134 and includes one or more logical stores (e.g., documents, file caches, SQL databases, etc.), which are implemented to store data on one or more storage devices 138. Storage devices 138 may be situated on the same computing device or alternatively multiple different computing devices. Each storage device 138 may be any of a wide variety of storage devices, and typically is a nonvolatile memory device but may alternatively be a volatile memory device. Examples of such storage devices include magnetic disks, optical disks, Flash memory, and so forth.

By implementing multiple layers as illustrated in FIG. 4, the storage of the annotations is abstracted from the client applications. Thus, the annotation manager(s) in the common annotation layer are aware of (e.g., pre-programmed with identifiers of) the annotation store and the various storage devices as well as how to access them, but the client applications need have no knowledge of (although the client applications may optionally have knowledge of) where these storage devices are, how to access the storage devices, etc.

The Common Annotation Framework can be implemented in a variety of different manners. In one implementation, the Common Annotation Framework is implemented as a schema having annotation elements that represent annotations and anchor sub-elements to represent anchors. The annotation element governs the relationship among the anchor sub-elements it contains, and anchor sub-elements hold literal or by-reference resource content (optionally with position data).

Figure 5:
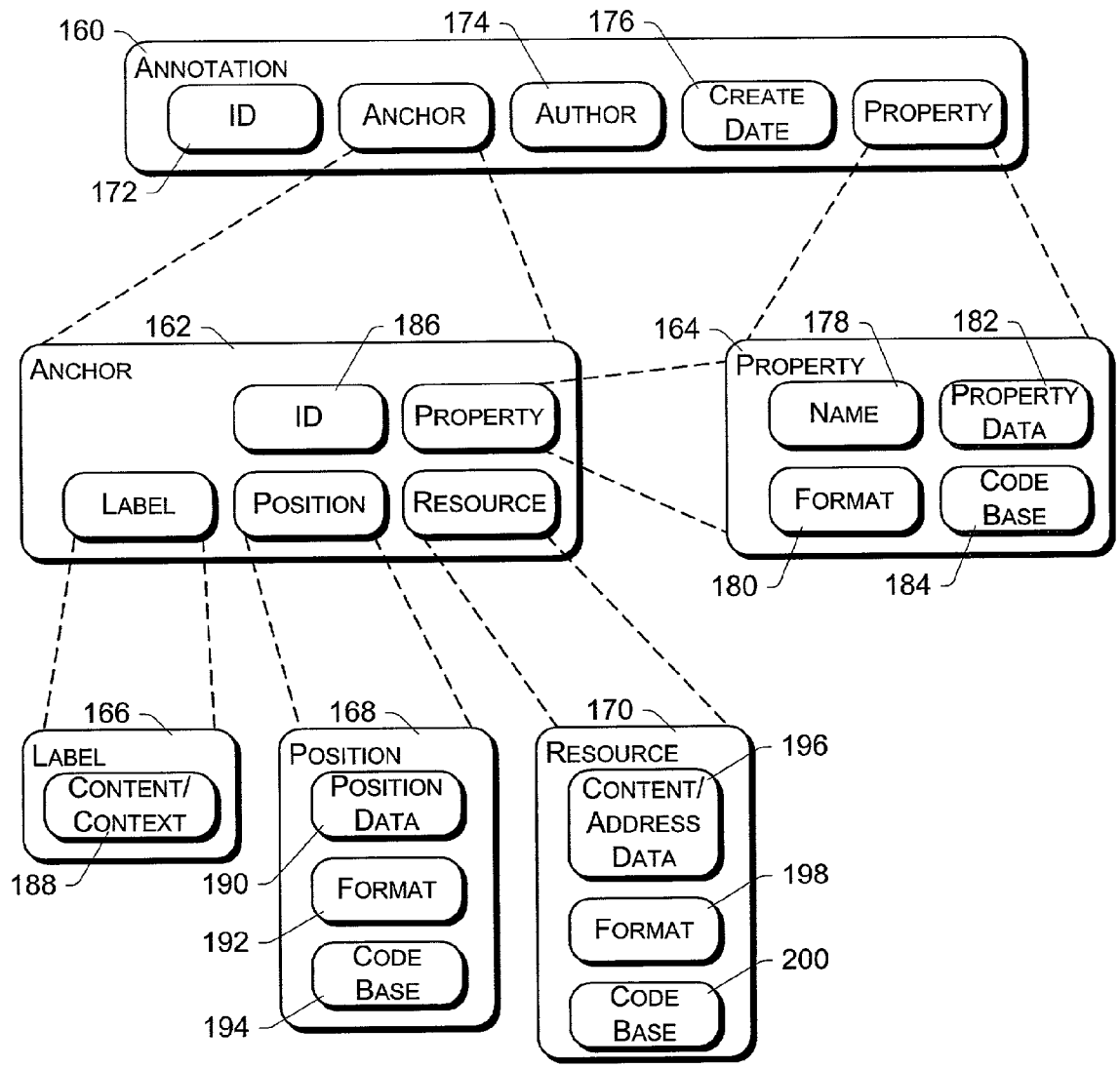
FIG. 5 is a block diagram illustrating an exemplary schema structure for implementing the Common Annotation Framework.

FIG. 5 is a block diagram illustrating an exemplary schema structure for implementing the Common Annotation Framework. The schema structure illustrated in FIG. 5 includes an annotation element 160, an anchor element 162, an optional property element 164, a label element 166, a position element 168, and a content element 170. Each of the elements or fields 162-170 is a sub-element of annotation element 160.

Annotation element 160 includes an id field 172 that contains data identifying the annotation element 160 (as discussed above, this may be a globally or locally unique identifier), an author field 174 that contains data identifying the author or creator of annotation element 160, and a create date field 176 that contains data identifying the creation date of the annotation. Annotation element 160 also includes an anchor sub-element 162, and a property sub-element 164.

Each property sub-element 164 includes a name field 178, a format field 180, a property data field 182, and a codebase field 184. Name field 178 contains data identifying the name of the property represented by property sub-element 164, property data field 182 contains the client application-defined data for the property sub-element 164, and format field 180 contains data identifying the format of the data contained in property data field 182. Property sub-elements 164 are extensions to the Common Annotation Framework and can be defined by the client applications that desire the additional properties. The name of the property, as well as the client application-defined data and the format of that data are determined by the client application and thus can be any of a wide variety of values. For example, in one embodiment of the invention, the format field may store an XML Schema "user-defined type" that precisely specifies the nature and structure of the data stored in the property 164 (see XML Schema 1.0, W3C recommendation 2 May 2001, http://www.w3.org/XML/Schema).

Codebase field 184 identifies a location(s) for information or instructions (e.g., a software code module(s)) that, when executed, can interpret the contents of property data field 182 based on format field 180. Codebase field 184 may be, for example, a URL of such a code module(s). During operation, if a client application retrieves an annotation element 160 including a property sub-element 164 having a format (as identified in format field 180) that the application does not understand, the client application can obtain the code module(s) identified in codebase field 184 and execute the obtained code module(s), thereby allowing the data in property data field 182 to be interpreted by the client application. Thus, annotations can be readily extended to include additional property elements; any application that is unable to interpret such additional property elements is able to access instructions (e.g., code modules) that allow it to interpret the additional property elements.

Anchor element 162 includes an id field 186 that contains an identifier that uniquely identifies the anchor locally (e.g., within annotation 160) or globally (e.g., as a GUID). Anchor element 162 also includes an optional property field 164 that contains a property sub-element. Both annotation element 160 and anchor element 162 can contain a property sub-element 164. Thus, annotations can be extended by adding annotation-related properties to the annotation element or anchor-related properties to the anchor element(s).

Anchor element 162 also includes a label sub-element 166, a position sub-element 168, and a resource sub-element 170.

Label sub-element 166 contains a content/context field 188 that contains an identifier of whether the anchor element is a content anchor or a context anchor. For example, in one implementation content/context field 188 may have one of two values, either a value of "content" to identify an anchor as a content anchor or the value of "context" to identify an anchor as a context anchor.

Position sub-element 168 includes a position data field 190, a format field 192, and a codebase field 194. Position data field 190 contains data that identifies a position for the anchor, while format field 192 contains data that identifies the format that the data in position data field 190 is in. Codebase field 194, analogous to codebase field 184 of property sub-element 164, identifies a location(s) for a code module(s) that, when executed, can interpret the contents of position data field 190 based on format field 192. Thus, a client application that retrieves an annotation with an anchor having positioning data that the client application does not know how to interpret, can obtain instructions identifying how to interpret the positioning data.

Resource sub-element 170 includes a content/address data field 196, a format field 198, and a codebase field 200. Content/address data field 196 contains literal resource data (it stores the resource "by value") or the address (or other identifier) of a resource (it stores the resource "by reference"). Format field 198 contains data that identifies the format that the data in content/address data field 196 is in. Codebase field 200, analogous to codebase field 184 of property sub-element 164, identifies a location(s) for a code module(s) that, when executed, 8 can interpret the data in content/address data field 196 based on format field 198. Thus, a client application that retrieves an annotation with an anchor having resource content/address data (literal or by-reference) that the client application does not know how to interpret, can obtain instructions identifying how to interpret the content data.

In alternate embodiments, the Common Annotation Framework may be designed to include one or more additional elements or fields. These additional elements or fields can be incorporated into the Common Annotation Framework structure by the designer/implementer of the Common Annotation Framework structure, or alternatively by a client application(s). In one implementation, two such additional elements or fields are composite anchors and sets.

A composite anchor allows more structure to be specified in an annotation relationship than is typically available with only the context and content anchors. A composite anchor can be used, for example, to group redundant context anchors (e.g., where each context anchor supports a different method for positioning the annotation in the same resource), or to group multiple content anchors together (e.g., each of which represents a different human language translation of a user's comment).

Figure 6:
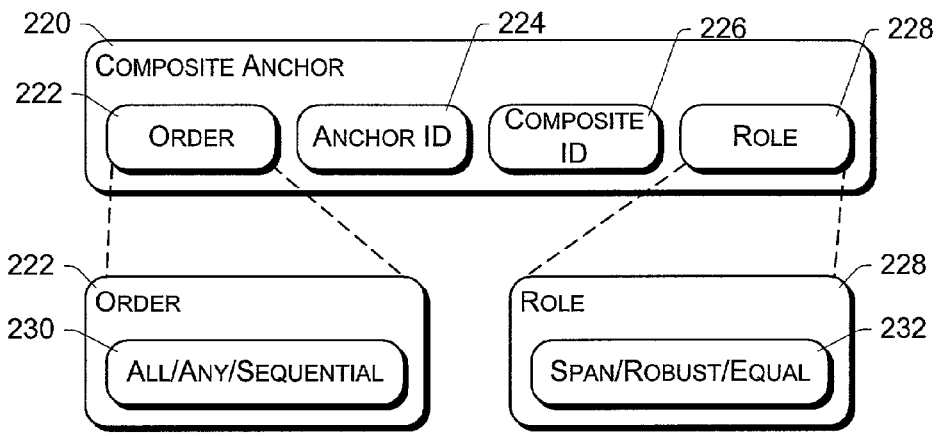
FIG. 6 is a block diagram illustrating an exemplary schema structure for a composite anchor.

FIG. 6 is a block diagram illustrating an exemplary schema structure for a composite anchor. A composite anchor 220 includes an order field 222, an anchor ID field 224, a composite ID field 226, and a role 228. Content, context, or other composite anchors can be included in a composite anchor 220. Content or context anchors are included in a composite anchor 220 by including an anchor ID field 224 for each such included content or context anchor, the field 224 containing the anchor ID of the included content or context anchor. Additional composite anchors are included in a composite anchor 220 by including an additional composite anchor structure (another anchor 220) as the content of a composite ID field 226. Alternatively, an anchor ID field may be included in a composite anchor so that composite anchors can be included in another composite anchor by reference to the ID, or content and/or context anchors may be included in a composite anchor by including the content or context anchor in the composite anchor rather than an ID of the content or context anchor.

Order field 222 includes data specifying how the anchor elements stored within a composite anchor (whether they are content anchors, context anchors, composite anchors, or combinations thereof) are to be used. Order field 222 is a sub-element that includes a value field 230 that allows for identification of "all", "any", or "sequential". An indication of "all" in value field 230 indicates that all of the anchors stored in the composite anchor must be used, a value of "any" indicates that the client application can choose any one of the anchors stored in the composite anchor, and a value of "sequential" indicates that the client application must use each anchor stored in the composite anchor in the order they are listed. Alternatively, order field 222 may be any other string value a client application (or Common Annotation Framework designer/implementer) wishes to define.

Role field 228 includes data describing the reason the anchors contained within the composite anchor 220 have been grouped together. Role field 228 is a sub-element that includes a value field 232 that allows for the identification of "span", "robust", or "equal". A value of "span" indicates that multiple anchors are used to define an annotation context which spans multiple elements of a document. A value of "robust" indicates that multiple context anchors are stored for robustness (e.g., each context anchor encodes a different type of information about the same location in a document). A value of "equal" indicates that different versions of the same content are stored in multiple anchors in the same annotation (e.g., multiple versions of the same comment, such as one in plain text, one spoken, one web page, etc.). Alternatively, role field 228 may be any other string value a client application (or Common Annotation Framework designer/implementer) wishes to define.

Figure 7:
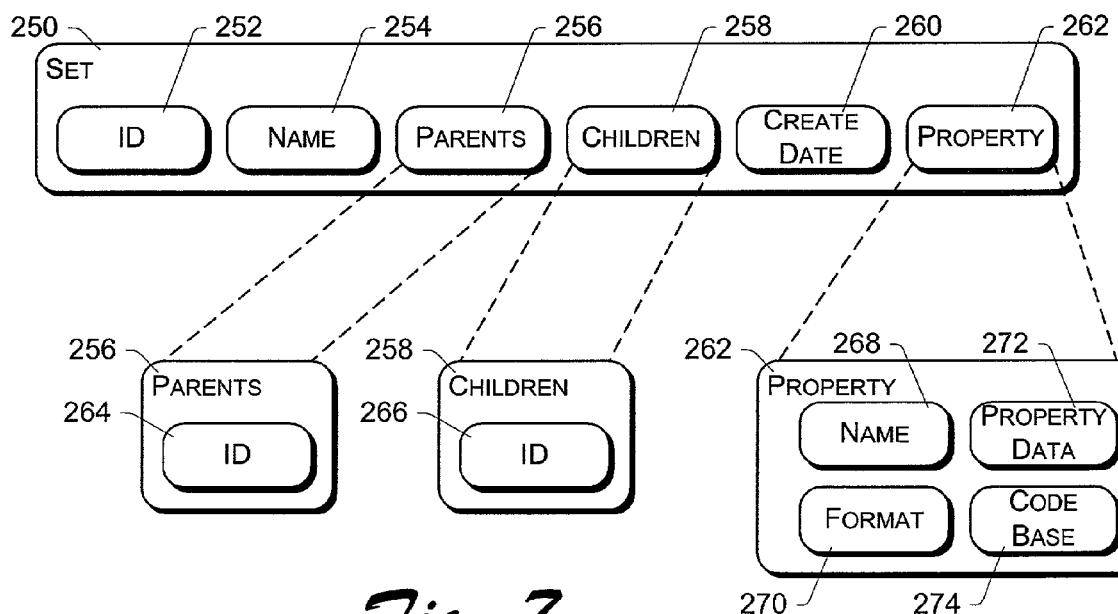
FIG. 7 is a block diagram illustrating an exemplary schema structure for a set element.

A set element allows annotations to be grouped together, such as for organization purposes, access control purposes, etc. FIG. 7 is a block diagram illustrating an exemplary schema structure for a set element. A set element 250 includes an ID field 252, a name field 254, an optional parents fields 256, a children field 258, a create date field 260, and an optional property field 262. ID field 252 contains data that uniquely identifies the set (either globally (such as a GUID) or locally (such as uniquely identifying the set within the annotation that the set element is part of)), and name field 254 contains data identifying a more user-friendly name for the set. Create date field 260 contains data that indicates when the annotation set was created. Annotations can be organized hierarchically, with each annotation being a member of zero or more sets and each set including one or more annotations. Additionally, sets can have other sets as members.

Parents field 256 is a sub-element that includes an ID field 264. ID field 264 contains data identifying another set that the current set is part of by the ID of that other set. Children field 258 is a sub-element that includes an ID field 266. ID field 266 contains data identifying either another set or an annotation by the ID of that other set or annotation, the identified other set or annotation being included in the current set.

Property field 262 is a sub-element that allows client applications to extend the functionality of the set by defining their own set properties. Analogous to property sub-element 164 of FIG. 5, property sub-element 262 includes a name field 268, a format field 270, a property data field 272, and a codebase field 274. Name field 268 contains data identifying the name of the property represented by property sub-element 262, property data field 272 contains the data for the property sub-element 262, format field 270 contains data identifying the format of the data contained in property data field 272, and codebase field 274 contains data identifying where to obtain a code module(s) with instructions that allow the data in fields 270 and 272 to be interpreted by a client application.

The schema defining the Common Annotation Framework can be implemented in any of a variety of manners. Tables I through XIII below illustrate one example. The schema described below with reference to Tables I through XIII (and extensions in Tables XIV and XV) is implemented using XML Schema language Version 1.0, a W3C Recommendation (May 2, 2001). The schema is based on the XML Linking Language (XLink), a W3C Recommendation (the current version is Version 1.0 (Jun. 27, 2001)). Additional information regarding XLink is available from the World Wide Web Consortium (W3C). However, the schema may alternatively be implemented based on other current, proposed, or future versions of XLink, or not based on the XLink recommendation. For example, the schema may be based on other standards or recommendations, or alternatively may be implemented in a proprietary manner (e.g., not based on any public standards or recommendations).

Table I below includes the code defining the Common Annotation Framework name and inheriting the appropriate previously defined and well-known schemas. The ellipses indicate the inclusion of additional elements, identified in Tables II through XIII below.

TABLE I

```
<?xml version="1.0"?>
<xsd:schema targetNamespace="aml-core"
    xmlns:xsd="http://www.w3c.org/2001/XMLSchema"
    xmlns:xlink="http://www.w3.org/1999/xlink"
    xmlns:aml="urn:aml-core">
. . . .
</xsd:schema>
```

Table II below includes the code defining an annotation element of the Common Annotation Framework (e.g., element 160 of FIG. 5). The annotation element includes arc, anchor and property elements. The anchor and property elements are analogous to those discussed above with reference to FIG. 5. The arc element allows relationships between anchors to be flexibly defined. Typically the arc is used to associate content anchors with context anchors, but in combination with changing the label attribute 188 in FIG. 5 on an anchor element, applications can also use Arcs to define new relationships among new types of anchors.

TABLE II

```
<xsd:element name="annotation" type="aml:AnnType" minOccurs="0" maxOccurs="unbounded"/>
    <xsd:complexType name="AnnType" mixed="false">
        <xsd:any processContents="lax" minOccurs="0" maxOccurs="unbounded"/>
        <xsd:anyAttribute processContents="lax"/>
        <xsd:attribute type="xlink:type" fixed="extended"/>
        <xsd:attribute type="aml:id" use="required"/>
        <xsd:attribute type="aml:author" use="optional"/>
        <xsd:attribute name="createdate" type="aml:date" use="optional"/>
        <xsd:element type="aml:arc" minOccurs="1" maxOccurs="1"/>
        <xsd:element type="aml:anchor" minOccurs="1" maxOccurs="unbounded"/>
        <xsd:element type="aml:property" minOccurs="0" maxOccurs="unbounded"/>
    </xsd:complexType>
```

Table III below includes the code defining an arc element of an annotation element of Table II. Alternatively, in some embodiments (e.g., those that are not based on Xlink) arc elements may not be used, in which case the code of Table III would not be used.

TABLE III

```
<xsd:complexType name="arc">
    <xsd:complexType>
        <xsd:complexContent>
            <xsd:restriction base="xsd:anyType">
                <xsd:attribute type="xlink:type" fixed="arc"/>
                <xsd:attribute type="xlink:from" default="context" use="optional"/>
                <xsd:attribute type="xlink:to" default="content" use="optional"/>
                <xsd:attribute type="xlink:arcrole" default="annotates" use="optional"/>
                <xsd:attribute type="xlink:role" default="annotation" use="optional"/>
                <xsd:attribute type="xlink:title" default="annotation" use="optional"/>
```

TABLE III-continued

```
            <xsd:attribute type="xlink:show" default="default" use="optional"/>
            <xsd:attribute type="xlink:actuate" default="default" use="optional"/>
        </xsd:restriction>
    </xsd:complexContent>
    </xsd:complexType>
</xsd:complexType>
```

Table IV below includes the code defining an anchor element of the Common Annotation Framework (e.g., element 162 of FIG. 5).

TABLE IV

```
<xsd:complexType name="anchor" mixed="true">
    <xsd:any proceesContents="lax" minOccurs="0" maxOccurs="unbounded"/>
    <xsd:anyAttribute processContents="lax"/>
    <xsd:choice>
        <xsd:group>
            <xsd:attribute type="xlink:type" fixed="resource"/>
            <xsd:attribute name="cid" type="aml:id" use="optional"/>
            <xsd:attribute type="xlink:href" use="prohibited"/>
        </xsd:group>
        </xsd:group>
            <xsd:attribute type="xlink:type" fixed="locator"/>
            <xsd:attribute type="xlink:href" use="required"/>
        </xsd:group>
    </xsd:choice>
    <xsd:attribute type="aml:id" use="required"/>
    <xsd:attribute type="xlink:label" use="required"/>
    <xsd:attribute type="aml:format" use="optional"/>
    <xsd:attribute type="aml:codebase" use="optional"/>
    <xsd:element type="aml:property" minOccurs="0" maxOccurs="unbounded"/>
</xsd:complexType>
```

Table V below includes the code defining a property element of the Common Annotation Framework (e.g., element 164 of FIG. 5).

TABLE V

```
<xsd:complexType name="property" mixed="true" >
    <xsd:any processContents="lax" minOccurs="0" maxOccurs="unbounded"/>
    <xsd:anyAttribute processContents="lax"/>
    <xsd:attribute name="aml:name" use="required"/>
    <xsd:attribute type="aml:format" use="optional"/>
    <xsd:attribute type="aml:codebase" use="optional"/>
</complexType>
```

Table VI below includes the code defining a date element of the Common Annotation Framework (e.g., element 176 of FIG. 5).

TABLE VI

```
<xsd:simpleType name="date" type="xsd:dateTime">
</xsd:simpleType>
```

Table VII below includes the code defining an author element of the Common Annotation Framework (e.g., element 174 of FIG. 5).

TABLE VII

```
<xsd:simpleType name="author" type="xsd:string">
</xsd:simpleType>
```

Table VIII below includes the code defining a format element of the Common Annotation Framework (e.g., elements 180, 192, or 198 of FIG. 5).

TABLE VIII

```
<xsd:simpleType name="format" type="xsd:anyURI">
</xsd:simpleType>
```

Table IX below includes the code defining a codebase element of the Common Annotation Framework (e.g., elements 184, 194, or 200 of FIG. 5).

TABLE IX

```
<xsd:simpleType name="codebase" type="xsd:anyURI">
</xsd:simpleType>
```

Table X below includes the code defining a name element of the Common Annotation Framework (e.g., element 178 of FIG. 5).

TABLE X

```
<xsd:simpleType name="name" type="xsd:string">
</xsd:simpleType>
```

Table XI below includes the code defining an ID element of the Common Annotation Framework (e.g., elements 172 or 186 of FIG. 5).

TABLE XI

```
<xsd:simpleType name="id" type="xsd:anyURI">
</xsd:simpleType>
```

Table XII below includes the code defining an anchor id element type that is locally unique within an instance of the annotation element of the Common Annotation Framework.

TABLE XII

```
<xsd:unique name="uniqueAnchorIdsInsideAnnotations">
    <xsd:selector xpath="aml:annotation/aml:anchor"/>
    <xsd:field xpath="@id"/>
</xsd:unique>
```

Table XIII below includes the code defining an annotation id element type that is a globally unique element of the Common Annotation Framework.

TABLE XIII

```
<xsd:unique name="uniqueAnnotationIds">
    <xsd:selector xpath=" .//aml:annotation"/>
    <xsd:field xpath="@id"/>
</xsd:unique>
```

Table XIV below includes the code for expanding the schema structure defined in Tables I through XIII above to include a composite element (e.g.,

TABLE XIV

```
<?xml version="1.0"?>
<xsd:schema targetNamespace="aml-ca"
        xmlns:xsd="http://www.w3.org/2001/XMLSchema"
        xmlns:aml="urn:aml-aml"
        xmlns:aca="urn:aml-ca">
    <xsd:element name="annotation" type="aca:AnnType" minOccurs="0"
maxOccurs="unbounded">
    <xsd:complexType name="AnnType" mixed="false">
        <xsd:complexContent>
            <xsd:extension base="aml:amlAnnType">
                <element type="aca:companc"
                    minOccurs="0" maxOccurs="unbounded"/>
            </xsd:extension>
        </xsd:complexContent>
    </xsd:complexType>
    <xsd:complexType name="companc" mixed="false">
        <xsd:any processContents="lax" minOccurs="0" maxOccurs="unbounded"/>
        <xsd:anyAttribute processContents="lax"/>
        <xsd:attribute type="aca:order" default="any" use="optional"/>
        <xsd:element type="aca: anchorid" minOccurs="0" maxOccurs="unbounded"/>
        <xsd:element type="aca:companc" minOccurs="0" maxOccurs="unbounded"/>
        <xsd:element type="aml:property" minOccurs="0" maxOccurs="unbounded"/>
    </xsd:complexType>
    <xsd:complexType name="anchorid">
        <xsd:complexType>
            <xsd:complexContent>
                <xsd:restriction base="xsd:anyType">
                    <xsd:attribute type="aml:id" use="required"/>
                </xsd:restriction>
            </xsd:complexContent>
        </xsd:complexType>
    </xsd:complexType>
    <xsd:simpleType name="order">
        <xsd:union memberTypes="aca:enumOrder xsd:string"/>
    </xsd:simpleType>
    <xsd:simpleType name="enumOrder">
        <xsd:restriction base="xsd:string">
            <xsd:enumeration value="any"/>
            <xsd:enumeration value="all"/>
            <xsd:enumeration value="sequential"/>
        </xsd:restriction>
    </xsd:simpleType>
</xsd:schema>
```

Table XV below includes the code for expanding the schema structure defined in Tables I through XIII above to include sets (e.g., a set element 250 of FIG. 7).

TABLE XV

```
<?xml version="1.0"?>
<xsd:schema targetNamespace="aml-set"
        xmlns:xsd="http://www.w3c.org/2001/XMLSchema"
        xmlns:aca="urn:aml-ca"
        xmlns:amls="urn:aml-set">
    <xsd:element name="set" type="amls:setType" minOccurs="0"
    maxOccurs="unbounded"/>
    <xsd:complexType name="set" mixed="false">
        <xsd:any processContents="lax" minOccurs="0" maxOccurs="unbounded"/>
        <xsd:anyAttribute processContents="lax"/>
        <xsd:attribute name="id" type="aml:id" use="required"/>
        <xsd:attribute name="parents" type="amls:idrefs" use="optional"/>
        <xsd:attribute name="children" type="amls:idrefs" use="optional"/>
        <xsd:attribute name="createdate" type="aml:date" use="optional"/>
        <xsd:attribute type="aml:name" use="required"/>
        <xsd:element type="aml:property" minOccurs="0" maxOccurs="unbounded"/>
    </xsd:complexType>
    <xsd:element name="annotation" type="amls:AnnType" minOccurs="0"
    maxOccurs="unbounded">
    <xsd:complexType name="AnnType" mixed="false">
        <xsd:complexContent>
            <xsd:extension base="aca:AnnType">
                <attribute name="sets" type="amls:idrefs"
                    use="optional"/>
            </xsd:extension>
        </xsd:complexContent>
    </xsd:complexType>
    <xsd:simpleType name="idrefs">
        <xsd:list itemType="aml:id"/>
    </xsd:simpleType>
</xsd:schema>
```

The core schema described above may also be expanded by a client application by adding in one or more ancillary schemas. An ancillary schema identifies a particular data type and also a codebase that identifies how to process the data type. The data type may be a proprietary type, or alternatively may be public-based (e.g., based on XML). In one implementation, if an ancillary schema is based on XML, the format attribute of the element containing the data described by the schema contains the MIME (Multipurpose Internet Mail Extensions) type string "text/xml", which indicates to client applications that the contents of the element are in the XML format and can be parsed and optionally validated. If the client application understands the data type (e.g., knows how to process the data type) it can do so; otherwise, it can obtain instructions (e.g., software code) from the location identified by the codebase that indicate how the client application is to process the data type (e.g., obtained software code may be executed to process the code).

Figure 8:
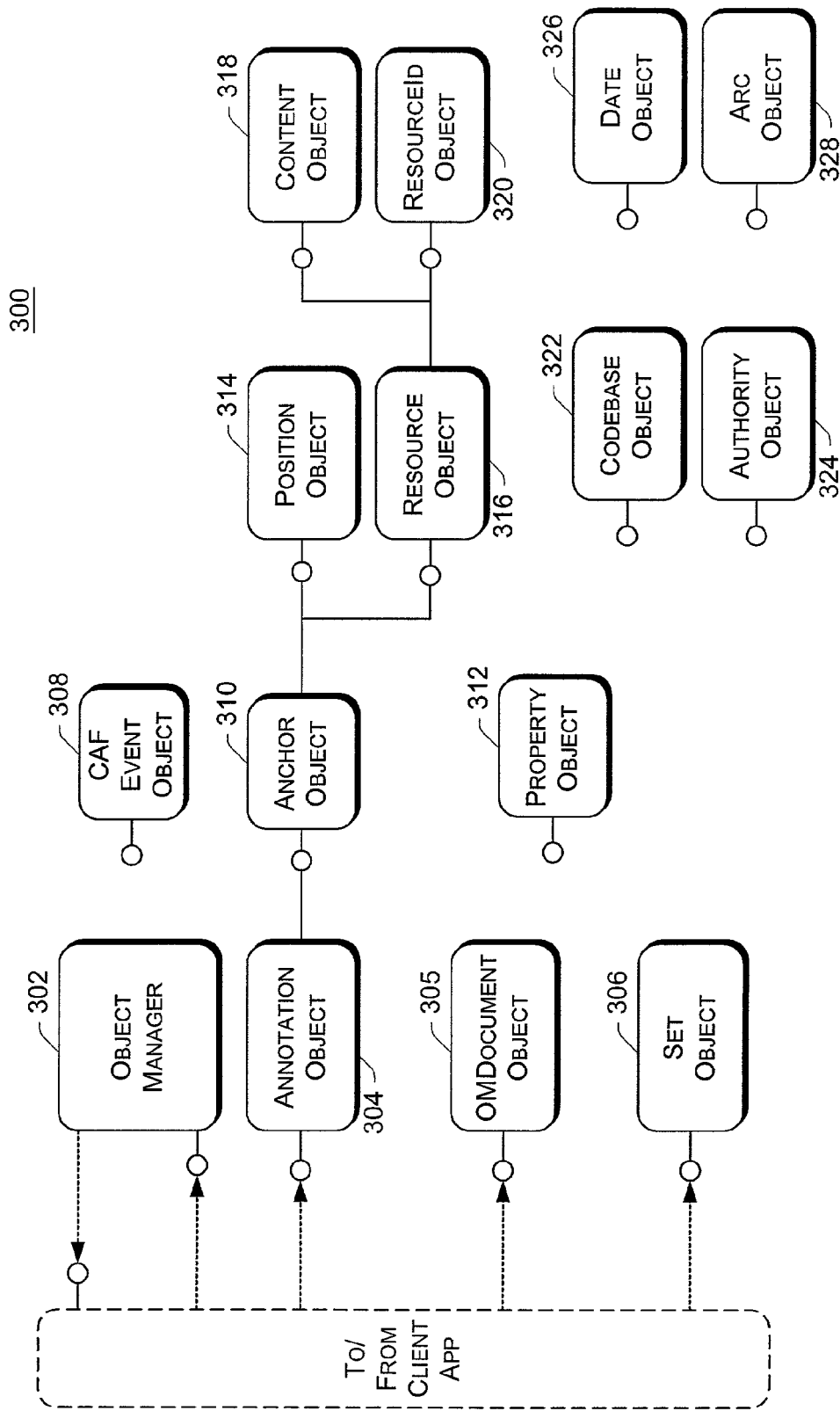
FIG. 8 is a block diagram illustrating an exemplary object model for the Common Annotation Framework.

FIG. 8 is a block diagram illustrating an exemplary object model 300 for the Common Annotation Framework. The object model 300 is implemented in common annotation layer 136 of FIG. 4, and corresponds to the various elements of the schema illustrated in FIG. 5.

Object model 300 includes an object manager object 302, an annotation object 304, an OMDocument object 305, a set object 306, a Common Annotation Framework (CAF) event object 308, an anchor object 310, a property object 312, a position object 314, a resource object 316, a content object 318, a resource ID object 320, a codebase object 322, an authority object 324, a date object 326, and an arc object 328. In the illustrated example each of these objects 302-328 is implemented as a component object model (COM) object.

Alternatively, other implementations may implement the objects using different standards The operation of these objects is discussed in additional detail below. It is to be appreciated that although only one of each type of object is illustrated in model 300, when implemented numerous objects of the same type (e.g., numerous annotation objects) can, and typically will, be used.

Object manager object 302 provides interfaces to allow client applications to create objects, save objects to the annotation store, remove objects from the annotation store, and retrieve objects from the annotation store. In one implementation, object 302 implements the functionality of annotation manager 134 of FIG. 4. Object 302 exposes an ICAFExtendedStorageHandler interface and an ICAFObjectMgr interface (which inherits from the ICAFExtendedStorageHandler interface) that include methods for storing, deleting, modifying, and retrieving annotation and set objects, as well as an Invoke( ) method used to implement extended methods. Table XVI below contains an overview of the methods in the ICAFExtendedStorageHandler interface. Table XVII includes additional methods in the ICAFObjectMgr interface (in addition to those inherited from the ICAFExtendedStorageHandler interface).

TABLE XVI

| Method | Type | Description |
|---|---|---|
| async | read/write property | Determines whether other methods in ICAFObjectMgr execute asynchronously (e.g., true=asynchronous; false=synchronous). |
| create Object | method | Creates a new object, such as an annotation object or set object. For example, when a client application wishes to obtain a new |

TABLE XVI-continued

| Method | Type | Description |
|---|---|---|
| | | annotation object, the client application can call createObject( ) specifying "annotation". The object returned to the client application will expose the ICAFAnnotation interface and will have an appropriately unique id. If "set" is specified, the object returned will expose ICAFSet and will have an appropriately unique id. |
| save | method | Saves an object (or collection of objects) to the annotation store with which the object manager (object 302) is associated. In one implementation, annotation objects and set objects can be saved using this method. |
| remove | method | Removes an object (or collection of objects) from the store with which the object manager (object 302) is associated. |
| retrieve | method | Retrieves an object (or collection of objects) from the store with which the object manager (object 302) is associated. In one implementation, annotation objects, set objects, and application-defined extended objects can be retrieved using the retrieve( ) method. |
| cancel | method | Aborts an outstanding asynchronous call. |
| status | method | Returns the current status code for the specified outstanding call. |

TABLE XVII

| | | |
|---|---|---|
| invoke | method | Executes extended methods (methods implemented by an application over and above the functionality defined by the Common Annotation Framework). Examples include checking to see if there are any annotation which meet a specified set of criteria without actually retrieving the annotations, administering and checking access rights, administering and checking application policies, querying server version and/or capabilities, etc. |
| codebase | method | Returns a codebase URL for a specified format string. |

Table XVIII below includes exemplary idl (interface definition language) code that specifies the ICAFExtendedStorageHandler interface exposed by object Go manager object 302. Table XIX below includes exemplary idl code that specifies the ICAFObjectMgr interface exposed by object manager object 302.

TABLE XVIII

```
[
    object,
    uuid(FE1B94A5-7F20-470b-ACD7-0E22E583E50A),
    dual,
    oleautomation,
    helpstring("ICAFExtendedStorageHandler Interface"),
    pointer_default (unique)
]
interface ICAFExtendedStorageHandler : IDispatch
{
    //object storage methods
    [id(DISPID_ICAFEXTSTG|2),helpstring("create a new object")]
    HRESULT createObject([in] BSTR objectName,
                            [in,optional] BSTR objectNamespace,
                            [out,retval] VARIANT* obj);
    [id(DISPID_ICAFEXTSTG|3),helpstring("save a CAF object or collection")]
    HRESULT save([in] VARIANT object,
                            [out,retval] long* callId);
    [id(DISPID_ICAFEXTSTG|4),helpstring("remove a CAF object or collection")]
    HRESULT remove([in] VARIANT object,
                            [out,retval] long* callId);
    [id(DISPID_ICAFEXTSTG|5),helpstring("retrieve CAF objects in a CAFObjectList")]
    HRESULT retrieve ([in,optional] BSTR retrievalCriteria,
                            [out,retval] VARIANT* objectListOrCallId);
    //asynchronous control methods
    [id(DISPID_ICAFEXTSTG|1),propget,helpstring("determine whether methods exec async")]
    HRESULT async([out,retval] VARIANT_BOOL* async);
    [id(DISPID_ICAFEXTSTG|1),propput,helpstring("set async method execution")]
    HRESULT async([in] VARIANT_BOOL async);
    [id(DISPID_ICAFEXTSTG|6),helpstring("cancel an outstanding command")]
    HRESULT cancel([in] long callId);
    [id(DISPID_ICAFEXTSTG|7),helpstring("get status of an outstanding command")]
    HRESULT status([in] long callId, [out,retval] long* status);
};
```

TABLE XIX

```
[
    object,
    uuid(6CBA52F7-3562-11d3-8DC6-00E0290A79B8),
    dual,
    oleautomation,
    helpstring("ICAFObjectMgr Interface"),
    pointer_default(unique)
]
interface ICAFObjectMgr : ICAFExtendedStorageHandler
{
    //methods
    [id(DISPID_ICAFOBJECTMGR|1),helpstring("invoke a custom command")]
    HRESULT invoke([in] BSTR commandNamespace,
                    [in] BSTR command,
                    [in,optional] VARIANT arguments,
                    [out,retval] VARIANT* DataOrCallId);
    [id(DISPID_ICAFOBJECTMGR|2),helpstring("Obtain Codebase for specified criteria")]
    HRESULT codebase([in] VARIANT criteria,
                    [out,retval] VARIANT* CodebaseOrCallId);
};
```

The object manager's retrieve( ) method takes two arguments. The first is a string containing the query criteria by which objects are to be retrieved from an annotation store; and the second argument supports returning data directly (when retrieve( ) is called synchronously), or returning a method call ID (when retrieve( ) is called asynchronously). The first string query criteria argument can be expressed in any of a number of standard query languages—including SQL, XPath, XMLQuery, and others—or in an application-defined query language. The particular query language used is determined by what language or languages the calling application can express, and what language or languages the Extended Storage Handler handling the retrieve( ) call can parse.

The object manager's retrieve( ) method returns an OMDocument object 305 (which exposes an ICAFOMDocument interface) for a particular query The OMDocument object 305 is a collection of the objects that are returned by the query. For example, if a client application retrieves a collection of annotations, it will get back an OMDocument 305 full of annotation objects, whereas if it retrieves a collection of annotation sets, it will get an OMDocument 305 containing set objects. This way, the client application can make multiple different queries and get back separate collections which it can manage independently. Table XX below contains an overview of the methods in the ICAFOMDocument interface.

TABLE XX

| Method | Type | Description |
| --- | --- | --- |
| item | read only property | Retrieves the specified item from the OMDocument collection. |
| count | read only property | Identifies the number of objects in the OMDocument collection. |
| next | method | Retrieves the next object in the OMDocument collection. |
| reset | method | Resets the iterator to in the beginning of the OMDocument collection. |
| add | method | Adds an object to the OMDocument collection. |
| remove | method | Removes an object from the OMDocument collection. |
| _NewEnum | method | Generates a copy of the OMDocument collection |

Table XXI below includes exemplary idl code which specifies the ICAFOMDocument interface exposed by OMDocument object 305.

TABLE XXI

```
#define DISPID_NEWENUM -4
[
    object,
    uuid(EBEEB053-0D8A-4c83-8A4F-647B03E611A7),
    dual,
    oleautomation,
    helpstring("ICAFOMDocument Interface"),
    pointer_default(unique)
]
interface ICAFOMDocument: IDispatch
{
    [id(DISPID_VALUE), propget, helpstring("collection of objects")]
    HRESULT item([in] long index, [out, retval] IDispatch** object);
    [id(DISPID_ICAFOBJECTLIST|2), propget, helpstring("number of objects in the collection")]
    HRESULT count([out, retval] long* count);
    [id(DISPID_ICAFOBJECTLIST|3), propget, helpstring("get next object from
```

TABLE XXI-continued

```
iterator")]
    HRESULT next([out, retval] IDispatch** nextObject);
    [id(DISPID_ICAFOBJECTLIST|4), helpstring("reset the position of iterator")]
    HRESULT reset( );
    [id(DISPID_ICAFOBJECTLIST|5), helpstring("add an object to this document")]
        HRESULT add([in] IDispatch* obj,
                    [out,retval] long* pIndex);
    [id(DISPID_ICAFOBJECTLIST|6), helpstring("remove an object from this document")]
        HRESULT remove([in] long index,
                        [out,retval] IDispatch** ppObj);
    [id(DISPID_NEWENUM), propget, restricted, hidden]
    HRESULT _NewEnum([out, retval] IUnknown** ppunkNewEnum);
};
```

Returning to object manager object 302, the ICAFObjectMgr interface can operate synchronously or asynchronously. When operating synchronously, the calling client application is blocked until execution of the invoked method completes. When a method completes, a status code pertaining to the entire method execution is returned to the caller, along with data resulting from the call (if there is any). The object manager may also optionally issue a DCAFObjectMgrEvents::cmdComplete( ) event (discussed in more detail below). This event is not needed by the calling client application, but may be used by other agents or components listening in on the activity of the object manager.

When operating asynchronously, the invoked methods (e.g., retrieve) do not return data directly, and the order in which methods are called in the interface has no bearing on the order in which they may complete. Data and error state pertaining to the method executed are returned to the calling client application via the DCAFObjectMgrEvents interface, which includes methods for notifying an application of the progress, completion, and error status of outstanding asynchronous calls into the ICAFObjectMgr interface. By implementing DCAFObjectMgrEvents, a client application can receive these notifications, and can receive result data in the form of annotation event objects (which expose the ICAFEventInfo interface). Client applications can match asynchronous call launches to callbacks in the DCAFObjectMgrEvents interface by caching the CallID value returned from each method (when ICAFObjectMgr is in asynchronous mode) and comparing it to the value of ICAFEventInfor::get_CallId( ) on the annotation event object for the callback.

Table XXII below contains an overview of the methods in the DCAFObjectMgrEvents interface exposed by a client application.

TABLE XXII

| Method | Type | Description |
| --- | --- | --- |
| cmdProgress | method | Indicates that the corresponding call is still processing, and gives progress status. |
| cmdComplete | method | Indicates that the corresponding call has completed, and returns any data associated with the corresponding call, for instance an OMDocument containing the results of a call to retrieve( ). |
| cmdException | method | Indicates that the corresponding call caused an exception and is being terminated. |

CAF event object 308 is used to communicate information about asynchronous calls to the client application via the DCAFObjectMgrEvents interface of the client application. During an asynchronous call execution, when one of the DCAFObjectMgrEvents interface methods is called by object manager 302, object manager 302 passes in a CAF event object 308 containing information about which call the event corresponds to and what the status of the call is. The client application receiving the CAF event object 308 can obtain this information through the ICAFEventInfo interface of the event object 308.

Table XXIII below contains an overview of the methods in the ICAFEventInfo interface of CAF event object 308. It should be noted that the arguments property of the ICAFEventInfo interface is optional.

TABLE XXIII

| Method | Type | Description |
| --- | --- | --- |
| callId | read only property | Id of the call to which the information in the event object pertains. |
| method | read only property | String identifying the name of the ICAFObjectMgr method that was called. When ICAFObjectMgr::invoke( ) is called, this property contains "invoke" and the arguments property contains the actual extended method name. |
| data | read only property | Data that is returned from the pertinent call. For example, if the event object pertains to a call to ICAFObjectMgr::retrieve( ), this property will contain a list of the objects retrieved from the store. For a call to ICAFObjectMgr::save( ), this property will contain a pointer to the object that was saved. |
| status | read only property | HRESULT indicating current status of the call. When the event object comes from a call to DCAFObjectMgrEvents::cmdComplete( ) or cmdStopping( ), this property contains the final status of the entire call execution. |
| errorInfo | read only property | Extended error information encapsulated in an error object exposing the standard IErrorInfo interface. |

Table XXIV below includes exemplary idl code which specifies the DCAFObjectMgrEvents interface exposed by object manager object 302.

TABLE XXIV

```
[
    uuid(6CBA52F8-3562-11d3-8DC6-00E0290A79B8),
    helpstring("ICAFObjectMgrEvents Interface"),
]
dispinterface ICAFObjectMgrEvents
{
properties:
methods:
[id(DISPID_ICAFOBJECTMGREVENTS|1),helpstring("a command is progressing")]
```

TABLE XXIV-continued

```
HRESULT cmdProgress([in] VARIANT info);
[id(DISPID_ICAFOBJECTMGREVENTS|2),helpstring("a command is
complete")]
HRESULT cmdComplete([in] VARIANT info);
[id(DISPID_ICAFOBJECTMGREVENTS|3),helpstring("there was an
exception")]
HRESULT cmdException([in] VARIANT info);
};
```

Table XXV below includes exemplary idl code which specifies the ICAFEventInfo interface exposed by CAF event object 308.

TABLE XXV

```
[
    object,
    uuid(50EA0EBC-2982-4aa8-8EBA-AA53529D16D3),
    dual,
    oleautomation,
    helpstring("ICAFEventInfo Interface"),
    pointer_default(unique)
]
interface ICAFEventInfo : IDispatch
{
    //properties
    [id(DISPID_ICAFEVENTINFO|1),propget,helpstring("get call callId")]
    HRESULT callId([out,retval] long* callId);
    [id(DISPID_ICAFEVENTINFO|2),propget,helpstring("get method name")]
    HRESULT method([out,retval] BSTR* method);
    [id(DISPID_ICAFEVENTINFO|4),propget,helpstring("get data returned from store")]
    HRESULT data([out,retval] VARIANT* data);
    [id(DISPID_ICAFEVENTINFO|5),propget,helpstring("get status")]
    HRESULT status([out,retval] long* hresult);
    [id(DISPID_ICAFEVENTINFO|6),propget,helpstring("get error info")]
    HRESULT errorInfo([out,retval] VARIANT* err);
};
```

Each of the remaining objects 304, 306, and 310-328 each expose one interface which is named to reflect the purpose of the object. The following set of additional interfaces is also exposed by each object 304, 306, and 310-328 (with exceptions for property object 312 discussed below): an IPropertyBag interface, an IPropertyBag2 interface, an IXMLDOMNode interface, and an IPersistXML interface. However, property object 312 does not expose the IPropertyBag or the IPropertyBag2 interface (alternatively, property object 312 could expose these two properties, thereby allowing arbitrary properties to be assigned to arbitrary properties).

The interface of each object that is to be extensible encapsulates access to properties allowing the extensibility. Alternatively, rather than having the properties added directly into the object interfaces to which they apply, a separate interface may be exposed that encapsulates access to properties that are common to each of the extensible objects in the Common Annotation Framework. Table IXXVI below contains an overview of the methods in the ICAFExtensibleObject interface of an object.

TABLE XXVI

| Method | Type | Description |
|---|---|---|
| format | read/write property | String describing the format of the object. |
| appCode | read/write | Data describing the client application-level |

TABLE XXVI-continued

| Method | Type | Description |
|---|---|---|
| Base | property | code that is capable of handling this object (e.g., specifying the location, download instructions, version number, etc. of the client application-level code). |
| appCode BaseFormat | read/write property | String specifying the format of the data in the appCodeBase property. |

The IPropertyBag and IPropertyBag2 interfaces are well-known interfaces that allow a client application to assign, discover, and retrieve arbitrary additional properties on an object. The IXMLDOMNode interface is a well-known interface that includes the methods needed to manipulate an object as part of an XML parse tree. The IPersistXML interface is a well-known interface for persisting XML.

Annotation object 304 allow client applications to access the data representing individual annotations, including both context and content anchors. Annotation object 304 represents annotation element 160 of FIG. 5. Annotation object 304 exposes the ICAFAnnotation interface, which includes methods for getting and setting the annotation object's properties, for obtaining a list of the IDs of sets to which the annotation belongs, and for obtaining the annotation's anchors. Table XXVII below contains an overview of the methods in the ICAFAnnotation interface of annotation object 304. Table XXVIII below includes exemplary idl code which specifies the ICAFAnnotation interface exposed by annotation object 304.

TABLE XXVII

| Method | Type | Description |
|---|---|---|
| id | read only property | Id of the annotation object. This value is assigned by the object manager when it creates the new annotation object as the result of a call to ICAFObjectMgr::createObject( ). |
| owner | read/write property | Data identifying the owner of the annotation object. |
| author | read/write property | Data identifying the author of the annotation object. |

TABLE XXVII-continued

| Method | Type | Description |
|---|---|---|
| createDate | read only property | Data specifying the date and time on which the annotation object was created. The value and format of this property are determined by the object manager implementation and cannot be reset by client applications. |
| context Anchors | read only property | Contains a pointer to an anchor object which exposes the ICAFAnchor interface and contains ContextAnchor schema element data. |
| content Anchors | read only property | Contains a pointer to an anchor object which exposes the ICAFAnchor interface and contains ContentAnchor schema element data. |
| sets | read only property | List of the IDs of sets to which the annotation object belongs. This list can be modified by the implementation of the ICAFSet interface on a set object, which contains methods for adding and removing objects from the set. |
| object Manager | read only property | Data identifying the object manager object (e.g., object 302 of FIG. 8). |
| codebase | read only property | Data describing the client application-level code that is capable of handling this object (e.g., specifying the location, download instructions, version number, etc. of the client application-level code). |
| role | read/write property | The Xlink role value for this annotation object. |
| title | read/write property | The Xlink title value for this annotation object. |
| type | read only property | The Xlink type value for this annotation object. |
| arc | read only property | Data identifying an arc associated with this annotation object. |
| new Context Anchor | method | Creates a new context anchor for this annotation object. |
| new Content Anchor | method | Creates a new content anchor for this annotation object. |
| remove Anchor | method | Removes an anchor from this annotation object. |

TABLE XXVIII

```
[
    object,
    uuid(89C9A0BB-EA80-4FB1-A08C-D5F2179DDB37),
    dual,
    oleautomation,
    helpstring("ICAFAnnotation Interface"),
    pointer_default(unique)
]
interface ICAFAnnotation : IDispatch
{
    //properties
    [id(DISPID_VALUE),propget,helpstring("get this ann's id")]
    HRESULT id([out,retval] BSTR* id);
    [id(DISPID_ICAFANNOTATION|2),propget,helpstring("get object manager object")]
    HRESULT objectManager([out,retval] VARIANT* objmgr);
    [id(DISPID_ICAFANNOTATION|3),propget,helpstring("get the owner object")]
    HRESULT owner([out,retval] VARIANT* owner);
    [id(DISPID_ICAFANNOTATION|5),propget,helpstring("get the author object")]
    HRESULT author([out,retval] VARIANT* author);
    [id(DISPID_ICAFANNOTATION|7),propget,helpstring("get the creation date object")]
    HRESULT createDate([out,retval] VARIANT* datetime);
    [id(DISPID_ICAFANNOTATION|9),propget,helpstring("get the app codebase")]
    HRESULT codebase([out,retval] VARIANT* cb);
    [id(DISPID_ICAFANNOTATION|10),propget,helpstring("get XLink role")]
    HRESULT role([out,retval] BSTR* role);
    [id(DISPID_ICAFANNOTATION|10),propput,helpstring("put XLink role")]
    HRESULT role([in] BSTR role);
    [id(DISPID_ICAFANNOTATION|11),propget,helpstring("get XLink title")]
    HRESULT title([out,retval] BSTR* title);
    [id(DISPID_ICAFANNOTATION|11),propput,helpstring("put XLink title")]
    HRESULT title([in] BSTR title);
    [id(DISPID_ICAFANNOTATION|12),propget,helpstring("get XLink type")]
    HRESULT type([out,retval] BSTR* type);
    [id(DISPID_ICAFANNOTATION|14),propget,helpstring("get list of context anchors")]
    HRESULT contextAnchors([out,retval] VARIANT* anchors);
    [id(DISPID_ICAFANNOTATION|15),propget,helpstring("get list of content anchors")]
    HRESULT contentAnchors([out,retval] VARIANT* anchors);
```

TABLE XXVIII-continued

```
    [id(DISPID_ICAFANNOTATION|16),propget,helpstring("get this ann's parent sets")]
    HRESULT sets([out,retval] VARIANT* sets);
    [id(DISPID_ICAFANNOTATION|17),propget,helpstring("get this ann's arc")]
    HRESULT arc([out,retval] VARIANT* arc);
    //methods:
    [id(DISPID_ICAFANNOTATION|18), propget, helpstring("create a new context anchor for
this ann")]
    HRESULT newContextAnchor([out,retval] VARIANT* anchor);
    [id(DISPID_ICAFANNOTATION|19), propget, helpstring("create a new content anchor for
this ann")]
    HRESULT newContentAnchor([out,retval] VARIANT* anchor);
    [id(DISPID_ICAFANNOTATION|20), helpstring("remove an anchor")]
    HRESULT removeAnchor([in] VARIANT anchorId);
};
```

Set object 306 exposes the ICAFSet interface and allows access to the properties of an individual set, including access to the list of sets to which the set belongs. Set object 306 represents set element 250 of FIG. 7. Table XXIX below contains an overview of the methods in the ICAFSet interface of set object 306. Table XXX below includes exemplary code which specifies the ICAFSet interface exposed by set object 306.

TABLE XXIX

| Method | Type | Description |
| --- | --- | --- |
| id | read only property | ID of set object. This value is assigned by the object manager when it creates the new set object as the result of a call to ICAFObjectMgr::createObject( ). |
| parentSets | read only property | List of the IDs of sets to which this set belongs. This list can be modified by the add( ) and remove( ) methods in the ICAFSet interface of another set object. |

TABLE XXIX-continued

| Method | Type | Description |
| --- | --- | --- |
| children | read only property | List of the IDs of the sets and annotations which belong to this set. This list can be modified by the add( ) and remove( ) methods below. |
| owner | read/write property | Data identifying the owner of this set object. |
| add | method | Adds a new child to this set. |
| remove | method | Removes an existing child from this set. |
| name | read/write property | Data describing this set. |
| omCode base | read only property | Data describing the extension code that can be downloaded, installed, and executed by the object manager to process the property (e.g., specifying the location, download instructions, version number, etc. of the extension code). |
| appCode base | read only property | Data describing the client application-level code that is capable of handling this object (e.g., specifying the location, download instructions, version number, etc. of the client application-level code). |

TABLE XXX

```
[
    object,
    uuid(C276A1FA-ACB5-422f-850C-9C63BCD3A18C),
    dual,
    oleautomation,
    helpstring("ICAFSet Interface"),
    pointer_default(unique)
]
interface ICAFSet: IDispatch
{
    //properties:
    [id(DISPID_ICAFSET|1),propget,helpstring("get this set's id")]
    HRESULT id([out,retval] BSTR* id);
    [id(DISPID_ICAFSET|2),propget,helpstring("get set description")]
    HRESULT name([out,retval] BSTR* name);
    [id(DISPID_ICAFSET|2), propput,helpstring("set set description")]
    HRESULT name([in] BSTR name);
    [id(DISPID_ICAFSET|3),propget,helpstring("get a list of sets this set belongs to")]
    HRESULT parentSets([out,retval] VARIANT* sets);
    [id(DISPID_ICAFSET|3),propget,helpstring("get a list of this set's children")]
    HRESULT children([out,retval] VARIANT* children);
    [id(DISPID_ICAFSET|4),propget,helpstring("get owner object")]
    HRESULT owner([out,retval] VARIANT* owner);
```

TABLE XXX-continued

```
    [id(DISPID_ICAFSET|5),propget,helpstring("get the om Codebase")]
    HRESULT omCodebase([out,retval] VARIANT * Codebase);
    [id(DISPID_ICAFSET|6),propget,helpstring("get the app Codebase")]
    HRESULT appCodebase([out,retval] VARIANT * Codebase);
    //methods
    [id(DISPID_ICAFSET|7),helpstring("add a new child object to this set")]
    HRESULT add([in] VARIANT child);
    [id(DISPID_ICAFSET|8),helpstring("remove a child object from this set")]
    HRESULT remove([in] BSTR childId, [out,retval] VARIANT* child);
};
```

Anchor object 310 represents anchor element 162 of FIG. 5 (a context anchor or a content anchor). Anchor object 310 exposes the ICAFAnchor interface, which allows client applications to access properties and methods of an individual anchor. Table XXXI below contains an overview of the methods in the ICAFAnchor interface of anchor object 310. Table XXXII below includes exemplary idl code which specifies the ICAFAnchor interface exposed by anchor object 310.

TABLE XXXI

| Method | Type | Description |
| --- | --- | --- |
| resource | read only property | Pointer to the ICAFResource interface on the resource object describing the resource with which this anchor is associated. |
| position | read/write property | The position data for this anchor object, describing the portion of the resource with which this anchor is associated. |
| id | read only property | The ID of this anchor object. |
| role | read/write property | The Xlink role value for this anchor object. Determines the type of anchor, and typically has the value "context" or "content".. |
| title | read/write property | The Xlink title value for this anchor object. |
| type | read only property | The Xlink type value for this anchor object. |

TABLE XXXII

```
[
        object,
        uuid(53BC72D0-87F5-4b2b-A46E-9DE898806DD9),
        dual,
        oleautomation,
        helpstring("ICAFAnchor Interface"),
        pointer_default(unique)
]
interface ICAFAnchor : IDispatch
{
        //properties:
        [id(DISPID_VALUE),propget,helpstring("get position object")]
        HRESULT position ([out,retval] VARIANT* pos);
        [id(DISPID_VALUE),propput,helpstring("put position string directly into position object")]
        HRESULT position ([in] VARIANT pos);
        [id(DISPID_ICAFANCHOR|2),propget,helpstring("get the id")]
        HRESULT id([out,retval] BSTR* id);
        [id(DISPID_ICAFANCHOR|3),propget,helpstring("get resource object")]
        HRESULT resource([out,retval] VARIANT* resource);
        [id(DISPID_ICAFANCHOR|4),propget,helpstring("get XLink role")]
        HRESULT role([out,retval] BSTR* role);
        [id(DISPID_ICAFANCHOR|4),propput,helpstring("put XLink role")]
        HRESULT role([in] BSTR role);
        [id(DISPID_ICAFANCHOR|5),propget,helpstring("get XLink title")]
        HRESULT title([out,retval] BSTR* title);
        [id(DISPID_ICAFANCHOR|5),propput,helpstring("put XLink title")]
        HRESULT title([in] BSTR title);
        [id(DISPID_ICAFANCHOR|6),propget,helpstring("get XLink type")]
        HRESULT type([out,retval] BSTR* type);
};
```

During runtime, an anchor object may also have associated therewith (e.g., via a registry) a set of one or more position input modules and one or more position output modules. The position input modules are configured (e.g., pre-programmed) to be able to translate data from a given application-specific point or range selection (e.g., highlighted text in a text document) into position data and format information for storage in the anchor object. The position output modules are configured (e.g., pre-programmed) to be able to translate position data and format information from an anchor object into a particular application-specific point or range selection (e.g., highlighted text). The exact nature of these position input and output modules will vary, based on the manner in which selections are made, the type of media in which a selection is made (e.g. text, video, images, audio, etc), and the application mediating the selection (e.g. Microsoft® Word and Microsoft® Internet Explorer represent a text selection in a web page differently), among other factors.

In one implementation where multiple position input modules are associated with an anchor object, each module is queried to determine if it can translate the given selection from the application-specific selection representation to persistable position data. For instance, Microsoft Internet Explorer represents text selections in a web page as objects which implement the IHTMLTxtRange interface. The appropriate position input module is one that can translate the IHTMLTxtRange object to a data representation that can be persisted in the annotation's context anchor, and also sets values for the position's format and codebase fields that can be used later on. So an input module that can perform these steps is chosen from among all the input modules registered.

Similarly, where multiple position output modules are associated with an anchor object, the position format in combination with the codebase and the requested interface are used to determine one of the multiple position output modules to be used to translate the position data and format information back into the appropriate application-specific selection representation.

Position object 314 represents position element 168 of FIG. 5. Position object 314 exposes the ICAFPosition interface, which allows client applications to access the properties of an individual position object. Table XXXIII below contains an overview of the methods in the ICAFPosition interface of position object 314. Table XXXIV below includes exemplary idl code which specifies the ICAFPosition interface exposed by position object 314.

TABLE XXXIII

| Method | Type | Description |
|---|---|---|
| position | read/write property | Data describing the actual position within the anchor's resource that the position object corresponds to. |
| format | read/write property | The format of the data in the anchor. |
| codebase | read only property | Data describing the client application-level code that is capable of handling this object (e.g., specifying the location, |

TABLE XXXIII-continued

| Method | Type | Description |
|---|---|---|
| | | download instructions, version number, etc. of the client application-level code). |

TABLE XXXIV

```
[
    object,
    uuid(B42C0EE4-6780-4376-9608-98F16F124AEE),
    dual,
    oleautomation,
    helpstring("ICAFPosition Interface"),
    pointer_default(unique)
]
interface ICAFPosition : IDispatch
{
    //properties:
    [id(DISPID_VALUE),propget,helpstring("get position")]
    HRESULT position([out,retval] VARIANT* position);
    [id(DISPID_VALUE),propput,helpstring("set position")]
    HRESULT position([in] VARIANT position);
    [id(DISPID_ICAFPOSITION|3),propget,helpstring("get
    handling instructions")]
    HRESULT format([out,retval] BSTR* format);
    [id(DISPID_ICAFPOSITION|3),propput,helpstring("set
    handling instructions")]
    HRESULT format ([in] BSTR format);
    [id(DISPID_ICAFPOSITION|4),propget,helpstring("get the app
    codebase")]
    HRESULT codebase([out,retval] VARIANT * cb);
};
```

Resource object 316 represents content element 170 of FIG. 5. Resource object 316 exposes the ICAFResource interface, which allows a client application to access sub-elements of an individual resource. Resource objects contain either a URI (ResourceID) object (for resources identified by-reference) or a Content object (for resources identified by-value), but not both. Table XXXV below contains an overview of the methods in the ICAFResource interface of resource object 316. Table XXXVI below includes exemplary idl code which specifies the ICAFResource interface exposed by resource object 316.

TABLE XXXV

| Method | Type | Description |
|---|---|---|
| uri | read/write property | Pointer to the ICAFURI interface on the URI object contained within the resource. |
| content | read/write property | Pointer to the ICAFContent interface on the content object contained within the resource. |

TABLE XXXVI

```
[
        object,
        uuid(3A2E3396-5E64-4f56-BA33-3C9A925E3BBA),
        dual,
        oleautomation,
        helpstring("ICAFResource Interface"),
        pointer_default(unique)
]
interface ICAFResource : IDispatch
{
        //properties:
        [id(DISPID_ICAFRESOURCE|1),propget,helpstring("get resource id object")]
        HRESULT uri([out,retval] VARIANT* id);
        [id(DISPID_ICAFRESOURCE|1),propput,helpstring("put uri string directly into
resource id object")]
        HRESULT uri([in] VARIANT id);
        [id(DISPID_ICAFRESOURCE|2),propget,helpstring("get resource content object")]
        HRESULT content([out,retval] VARIANT* content);
        [id(DISPID_ICAFRESOURCE|2),propput,helpstring("put content directly into content
object")]
        HRESULT content([in] VARIANT content);
};
```

The URI (ResourceID) object 320, in conjunction with resource object 316, represents content element 170 of FIG. 5 when the resource is identified by-reference. The URJ object exposes the ICAFURI interface, which allows client applications to access properties of the URI object. Table XXXVII below contains an overview of the methods in the ICAFURI interface of the URI object. Table XXXVIII below includes exemplary idl code which specifies the ICAFURI interface exposed by the URI object.

TABLE XXXVII

| Method | Type | Description |
| --- | --- | --- |
| uri | read/write property | Data describing the uri of the resource to which the uri object belongs. |

TABLE XXXVII-continued

| Method | Type | Description |
| --- | --- | --- |
| format | read/write property | The format of the data in the uri object. |
| codebase | read only property | Data describing the client application-level code that is capable of handling this object (e.g., specifying the location, download instructions, version number, etc. of the client application-level code). |

TABLE XXXVIII

```
[
        object,
        uuid(75598896-C204-4b8a-9D7F-5B1F2D53B0DD),
        dual,
        oleautomation,
        helpstring("ICAFURI Interface"),
        pointer_default(unique)
]
interface ICAFURI : IDispatch
{
        //properties:
        [id(DISPID_VALUE),propget,helpstring("get URI")]
        HRESULT uri([out,retval] VARIANT* uri);
        [id(DISPID_VALUE),propput,helpstring("set URI")]
        HRESULT uri([in] VARIANT uri);
        [id(DISPID_ICAFRESOURCEID|2),propget,helpstring("get handling instructions")]
        HRESULT format([out, retval] BSTR* format);
        [id(DISPID_ICAFRESOURCEID|2),propput,helpstring("set handling instructions")]
        HRESULT format ([in] BSTR format);
```

TABLE XXXVIII-continued

```
    [id(DISPID_ICAFRESOURCEID|3),propget,helpstring("get the app codebase")]
    HRESULT codebase([out,retval] VARIANT * cb);
};
```

Content object 318, in conjunction with resource object 316, represents content element 170 of FIG. 5 when the resource is identified by value. Content object 318 exposes the ICAFContent interface, which allows client applications to access properties of an individual content object. Table XXXIX below contains an overview of the methods in the ICAFContent interface of content object 318. Table XL below includes exemplary idl code which specifies the ICAFContent interface exposed by content object 318.

TABLE XXXIX

| Method | Type | Description |
|---|---|---|
| id | read/write property | ID of the content object. This value is determined by the implementation of ICAFResource on the resource object which generated the content object. |
| content | read/write property | Raw resource content data. |
| format | read/write property | The format of the data in the content object. |
| codebase | read only property | Data describing the client application-level code that is capable of handling this object (e.g., specifying the location, download instructions, version number, etc. of the client application-level code). |

TABLE XL

```
[
    object,
    uuid(133491F0-3871-4b04-9D52-2923FE02D5D0),
    dual,
    oleautomation,
    helpstring("ICAFContent Interface"),
    pointer_default(unique)
]
interface ICAFContent : IDispatch
{
    //properties:
    [id(DISPID_VALUE),propget,helpstring("get content")]
    HRESULT content([out,retval] VARIANT* content);
    [id(DISPID_VALUE),propput,helpstring("set content")]
    HRESULT content([in] VARIANT content);
    [id(DISPID_ICAFCONTENT|2),propget,helpstring("get the content id")]
    HRESULT id([out,retval] BSTR* id);
    [id(DISPID_ICAFCONTENT|2),propput,helpstring("put the content id")]
    HRESULT id([in] BSTR id);
    [id(DISPID_ICAFCONTENT|3),propget,helpstring("get handling instructions")]
    HRESULT format([out,retval] BSTR* format);
    [id(DISPID_ICAFCONTENT|3),propput,helpstring("set handling instructions")]
    HRESULT format ([in] BSTR format);
    [id(DISPID_ICAFCONTENT|4),propget,helpstring("get the app codebase")]
    HRESULT codebase([out,retval] VARIANT * cb);
};
```

Codebase object 322 encapsulates properties and methods which apply to a single codebase specification. Codebase object 322 represents a codebase element (e.g., elements 184, 194, or 200 of FIG. 5, or element 274 of FIG. 7). Codebase object 322 exposes the ICAFCodebase interface, which allows a client application to access the methods and properties of the codebase object. Table XLI below contains an overview of the methods in the ICAFCodebase interface of codebase object 322. Table XLII below includes exemplary idl code which specifies the ICAFCodebase interface exposed by codebase object 322.

TABLE XLI

| Method | Type | Description |
| --- | --- | --- |
| Uri | read/write property | Address of computer instruction module specified by this codebase object. |

TABLE XLI-continued

| Method | Type | Description |
| --- | --- | --- |
| Format | read/write property | Format of the codebase uri (for instance, is it a standard URL, or a UNC path, or some other type of resource address?) |
| Clsid | read/write property | The Microsoft ® COM ID of the class implemented by the computer instruction module specified by this codebase object. |

TABLE XLII

```
[
    object,
    uuid(A2674861-4EB2-4731-B0D9-0F41E4B613CE),
    dual,
    oleautomation,
    helpstring("ICAFCodebase Interface"),
    pointer_default(unique)
]
interface ICAFCodebase : IDispatch
{
    // properties:
    [id(DISPID_VALUE),propget,helpstring("get the Codebase uri")]
    HRESULT uri([out,retval] VARIANT * uri);

[id(DISPID_VALUE), propput,helpstring("set the Codebase uri")]
    HRESULT uri([in] VARIANT uri);

[id(DISPID_ICAFCODEBASE|2),propget,helpstring("get the Codebase format")]
    HRESULT format([out, retval] BSTR* fmt);

[id(DISPID_ICAFCODEBASE|2), propput, helpstring("set the Codebase format")]
    HRESULT format([in] BSTR fmt);

[id(DISPID_ICAFCODEBASE|3),propget,helpstring("get the clsid for the code object")]
    HRESULT clsid([out,retval] BSTR* clsid);

[id(DISPID_ICAFCODEBASE|3), propput,helpstring("set the clsid for the code object")]
    HRESULT clsid([in] BSTR clsid);
};
```

Authority object 324 encapsulates information about annotation owners, authors, users, etc. Authority object 324 represents the 174 Author of FIG. 5. Authority object 324 exposes the ICAFAuthority interface, which allows a client application to access the methods and properties of authority object 324. Table XLIII below contains an overview of the methods in the ICAFAuthority interface of authority object 324. Table XLIV below includes exemplary idl code which specifies the ICAFAuthority interface exposed by authority object 324.

TABLE XLIII

| Method | Type | Description |
|---|---|---|
| Name | read/write property | Name of authority (for instance, the logon name or SMTP email address of the author of an annotation) |
| Format | read/write property | Format of the authority name string (for instance, this would specify whether the Name property represents a logon name, an SMTP email address, or some other type of name). |

TABLE XLIV

```
[
        object,
        uuid(B0A4E7FE-3A1B-46d4-ADE2-59CACE5608E6),
        dual,
        oleautomation,
        helpstring("ICAFAuthority Interface"),
        pointer_default(unique)
]
interface ICAFAuthority : IDispatch
{
        // properties:
        [id(DISPID_VALUE),propget,helpstring("get the authority name")]
        HRESULT name([out,retval] VARIANT * name);
        [id(DISPID_VALUE), propput,helpstring("set the authority name")]
        HRESULT name([in] VARIANT name);
        [id(DISPID_ICAFAUTHORITY|2),propget,helpstring("get the authority name format")]
        HRESULT format([out,retval] BSTR* fmt);
        [id(DISPID_ICAFAUTHORITY|2), propput,helpstring("set the authority name format")]
        HRESULT format([in] BSTR fmt);
};
```

Date object 326 encapsulates information about dates. Date object 326 represents a creation date element (e.g., element 176 of FIG. 5 or element 260 of FIG. 6). Date object 326 exposes the ICAFDate interface, which allows a client application to access the methods and properties of date object 326. Table XLV below contains an overview of the methods in the ICAFDate interface of date object 326. Table XLVI below includes exemplary idl code which specifies the ICAFDate interface exposed by date object 326.

TABLE XLV

| Method | Type | Description |
|---|---|---|
| date | read/write property | The entire string of data representing the date and time. |
| format | read/write property | Identifies the format of the string representing the date and time. |
| year | read only property | The year portion of the date and time. |
| month | read only property | The month portion of the date and time. |
| day | read only property | The day portion of the date and time. |
| hour | read only property | The hour portion of the date and time. |
| minute | read only property | The minute portion of the date and time. |
| timeZone Hour | read only property | The hour offset of the time from GMT. |
| timeZone Minute | read only property | The minute offset of the time from GMT. |

TABLE XLVI

```
[
    object,
    uuid(12C13D36-B02A-4686-B9DE-D9147B0E7B5D),
    dual,
    oleautomation,
    helpstring("ICAFDate Interface"),
    pointer_default(unique)
]
interface ICAFDate : IDispatch
{
    // properties:
    [id(DISPID_VALUE),propget,helpstring("get the unparsed date string")]
    HRESULT date([out, retval] BSTR * date);
    [id(DISPID_VALUE), propput,helpstring("set the date string")]
    HRESULT date([in] BSTR date);
    [id(DISPID_ICAFDATE|2),propget,helpstring("get the date string format")]
    HRESULT format([out,retval] BSTR* fmt);
    [id(DISPID_ICAFDATE|2), propput,helpstring("set the date string format")]
    HRESULT format([in] BSTR fmt);
    [id(DISPID_ICAFDATE|3),propget,helpstring("get year")]
    HRESULT year([out,retval] long * yr);
    [id(DISPID_ICAFDATE|4),propget,helpstring("get numeric month")]
    HRESULT month([out,retval] long * mo);
    [id(DISPID_ICAFDATE|6),propget,helpstring("get day")]
    HRESULT day([out,retval] long * day);
    [id(DISPID_ICAFDATE|7),propget,helpstring("get hour")]
    HRESULT hour([out,retval] long * hr);
    [id(DISPID_ICAFDATE|8),propget,helpstring("get minute")]
    HRESULT minute([out,retval] long * min);
    [id(DISPID_ICAFDATE|9),propget,helpstring("get second")]
    HRESULT second([out,retval] long * sec);
    [id(DISPID_ICAFDATE|10),propget,helpstring("get hours offset from GMT")]
    HRESULT timeZoneHour([out,retval] long * tzhr);
    [id(DISPID_ICAFDATE|11),propget,helpstring("get extra minutes offset from GMT")]
    HRESULT timeZoneMinute([out,retval] long * tzmin);
};
```

Arc object 328 encapsulates information about how anchors relate to one another. Arc object 328 represents an arc element of annotation element 160 of FIG. 5. Arc object 328 exposes the ICAFArc interface, which allows a client application to access the methods and properties of the arc object. Table XLVII below contains an overview of the methods in the ICAFArc interface of arc object 328. Table XLVIII below includes exemplary idl code which specifies the ICAFArc interface exposed by arc object 328.

TABLE XLVII

| Method | Type | Description |
|---|---|---|
| id | read only property | id of this arc (unique within an instance of an annotation) |
| to | read only property | the label of the anchor to which the arc points. |
| From | read only property | The label of the anchor from which the arc originates |

TABLE XLVII-continued

| Method | Type | Description |
|---|---|---|
| Role | read only property | The Xlink role value for this arc element |
| Title | read only property | The Xlink title value for this arc element |
| Show | read only property | The Xlink show value for this arc element |
| Actuate | read only property | The Xlink actuate value for this arc element |
| Type | read only property | The Xlink type value for this arc element |
| showCode base | read only property | The uri of the computer instruction module that can be used to execute the Xlink Show value. |
| actuate Codebase | read only property | The uri of the computer instruction module that can be used to execute the Xlink Actuate value. |

TABLE XLVIII

```
[
    object,
    uuid(CC182483-B2EF-4f38-8AB8-B72F736B5D1D),
    dual,
    oleautomation,
    helpstring("ICAFArc Interface"),
    pointer_default(unique)
]
interface ICAFArc : IDispatch
{
    // properties:
```

TABLE XLVIII-continued

```
    [id(DISPID_ICAFARC|1),propget,helpstring("get this arc's id")]
    HRESULT id([out,retval] BSTR* id);
    [id(DISPID ICAFARC|2),propget,helpstring("get XLink to")]
    HRESULT to([out, retval] BSTR* to);
    [id(DISPID_ICAFARC|3),propget,helpstring("get XLink from")]
    HRESULT from([out,retval] BSTR* from);
    [id(DISPID_ICAFARC|4),propget,helpstring("get XLink role")]
    HRESULT role([out,retval] BSTR* role);
    [id(DISPID_ICAFARC|5),propget,helpstring("get XLink title")]
    HRESULT title([out,retval] BSTR* title);
    [id(DISPID_ICAFARC|6),propget,helpstring("get XLink arc show property")]
    HRESULT show([out,retval] BSTR* show);
    [id(DISPID_ICAFARC|7),propget,helpstring("get XLink arc actuate property")]
    HRESULT actuate([out,retval] BSTR* actuate);
    [id(DISPID_ICAFARC|8),propget,helpstring("get XLink type")]
    HRESULT type([out,retval] BSTR* type);
    [id(DISPID_ICAFARC|9),propget,helpstring("get the show Codebase")]
    HRESULT showCodebase([out,retval] VARIANT * Codebase);
    [id(DISPID_ICAFARC|10),propget,helpstring("get the actuate Codebase")]
    HRESULT actuateCodebase([out,retval] VARIANT * Codebase);
};
```

Property object 312 represents property element 164 of FIG. 5. Property object 312 exposes the ICAFProperty interface, which allows client applications to access data of an individual property. Table XLIX below contains an overview of the methods in the ICAFProperty interface of property object 312. Table L below includes exemplary idl code which specifies the ICAFProperty interface exposed by property object 312.

TABLE XLIX

| Method | Type | Description |
|---|---|---|
| name | read only property | Name of the property. This value is determined by the client application when the property is created via the IPropertyBag::write( ) or IPropertyBag2::write( ) method. |

TABLE XLIX-continued

| Method | Type | Description |
|---|---|---|
| value | read/write property | Raw property value data. |
| Code Base | read/write property | Data describing the extension code that can be downloaded, installed, and executed by the object manager to process the property (e.g., specifying the location, download instructions, version number, etc. of the extension code). |
| format | read/write property | The format of the data in the property. |
| persist | read/write property | Data indicating whether the property will be persisted. |

TABLE L

```
[
    object,
    uuid(523DC8E1-EC26-41DA-A6A2-26DFA075792C),
    dual,
    helpstring("ICAFProperty Interface"),
    pointer_default(unique)
]
interface ICAFProperty : IDispatch
{
    //properties:
    [id(DISPID_VALUE),propget,helpstring("get the property value")]
    HRESULT value([out,retval] VARIANT* value);
    [id(DISPID_VALUE),propput,helpstring("set the property value")]
    HRESULT value([in] VARIANT value);
    [id(DISPID_ICAFPROPERTY|2),propget,helpstring("get the property name")]
    HRESULT name([out,retval] BSTR* name);
    [id(DISPID_ICAFPROPERTY|3),propget,helpstring("get the property format")]
    HRESULT format([out,retval] BSTR* format);
    [id(DISPID_ICAFPROPERTY|3),propput,helpstring("set the property format")]
    HRESULT format([in] BSTR format);
```

TABLE L-continued

```
    [id(DISPID_ICAFPROPERTY|4),propget,helpstring("get the property's app codebase")]
    HRESULT codebase([out,retval] VARIANT* cb);
    [id(DISPID_ICAFPROPERTY|5),propget,helpstring("determine whether property will be
persisted. true==yes, false==no.")]
    HRESULT persist([out,retval] VARIANT_BOOL* f);
    [id(DISPID_ICAFPROPERTY|5),propput,helpstring("determine whether property will be
persisted. true==yes, false==no.")]
    HRESULT persist([in] VARIANT_BOOL f);
};
```

In one implementation, one or more of the objects in object model 300 includes a "required" flag or property that, when set, indicates that the object's value must be processed completely or not at all. For example, suppose a client application encounters an anchor (or any other object with the "format" and "codebase" properties) and that the client application does not understand the value of the "format" property. The client application therefore needs to go to the location identified in the "codebase" property to obtain code to process the object's contents. However, further suppose that the URL specified by the "codebase" property is unavailable (e.g., the client executing the client application is currently offline). If the "required" flag were set, then the flag would indicate to the client application that it is not to process the anchor unless the anchor can be processed completely, so any other portions of the anchor are not to be processed (e.g., displayed to the user). On the other hand, if the "required" flag were not set, then the flag would indicate to the client application that it can partially process the anchor (e.g., display to the user those parts of the anchor that it knows how to process without the code from the "codebase" location).

The object model 300 of FIG. 8 may be further expanded by adding new methods to the object model. These additions may be implemented at design time (e.g., by a system designer or programmer implementing the Common Annotation Framework) or alternatively by client applications. If a new method is to be added during design time, the system designer or programmer can simply write it in to the appropriate objects of the object model. If a new method is to be added by a client application, the method can be added via the invokes method exposed by the ICAFObjectMgr interface.

The object model 300 of FIG. 8 may also be expanded by adding new objects to the object model. These additions may be implemented at design time (e.g., by a system designer or programmer implementing the Common Annotation Framework) or alternatively by client applications. If a new object is to be added during design time, the system designer or programmer adds a schema for the new object to the Common Annotation Framework. If a new object is to be added by a client application, the object manager is extended by registering an Extensible Storage Handler which enables the object manager to create, save, retrieve, and remove the new object type, and by registering code for instantiating the new object type.

The adding of new objects and methods to the object model by a client application is discussed in more detail below with reference to the Common Annotation Framework (CAF) runtime application programming interface (API).

The CAF runtime API provides runtime support for registering, unregistering, and loading handlers for extended properties, objects, and methods. The CAF runtime API can be implemented in a variety of different manners, such as a dynamically linked library (DLL), encapsulated in a Java class, etc.

The CAF runtime API includes methods for registering, unregistering, and loading extended property handlers (EPHs), which operate on properties within objects. An extended property handler has the following form:

HRESULT ExtPropHandlerName([in] LPVOID pUnk,
        [in] DWORD data,
        [out] LPVOID* ppUnk);

where ExtPropHandlerName represents the name of the extended property handler, pUnk represents the IUnknown interface on the object to which the property belongs, and ppUnk is a pointer to receive the IUnknown of the object after processing. Table LI below illustrates the methods in the CAF runtime API for support of extended property handlers.

TABLE LI

```
HRESULT registerHandler([in] LPCTSTR objectNamespace,
                        [in] LPCTSTR objectName,
                        [in] LPCTSTR propname,
                        [in] LPCSTR commandNamespace,
                        [in] LPCSTR commandName,
                        [in] BOOL invokeBefore,
                        [in] LPCTSTR modulePath,
                        [in] LPCTSTR handlerName);
HRESULT unregisterHandler([in] LPCTSTP objectNamespace,
                          [in] LPCTSTR objectName,
                          [in] LPCTSTR propname,
                          [in] LPCSTR commandNamespace,
                          [in] LPCSTR commandName,
                          [in] BOOL invokeBefore);
HRESULT loadHandler([in] LPCTSTR objectNamespace,
                    [in] LPCTSTR objectName,
                    [in] LPCTSTR propname,
                    [in] LPCSTR commandNamespace,
                    [in] LPCSTR commandName,
                    [out] BOOL* pfInvokeBefore,
                    [out] HANDLE* phModule,
                    [out] HANDLE* phProc);
HRESULT execPropHandlers([in] IUnknown* pUnk,
                         [in] LPCSTR commandNamespace,
                         [in] LPCSTR commandName,
                         [in] BOOL fInvokeBefore);
```

The registerHandler( ) method registers an Extended Property Handler (EPH) with the Common Annotation Framework. Its arguments include objectName and objectNamespace, which identify the type and version of the object for which the EPH is registered (that is, the object that will host the property which the EPH is designed to process); propName, the name of the property to be processed by the EPH; commandName and commandNamespace, which identify the name and version of the command (e.g., createObject, retrieve, save, remove, or some application-defined extended method) during which the EPH should be invoked; invokeBefore, which if TRUE tells the EPH to process the property before the command code is executed (for instance, before an annotation object is saved to a store), and after otherwise (for instance, after an annotation object has been retrieved from a store); modulePath, which identifies the specific code module that implements the EPH being registered; and handlerName, which identifies the specific entry point in the EPH module that implements the EPH.

The unregisterHandler( ) method reverses the action of the registerHandler( ) method, and unregisters any EPHs that meet the criteria specified by the input arguments.

The loadHandler( ) method is used by the CAF Object Manager to load the appropriate EPH based on the name and type of object at hand (for instance, for an annotation object defined in the CAF core namespace, objectName would be "annotation", and objectNamespace would be "aml-core"), and the name and version of the command being invoked (commandName and commandNamespace). The Object Manager is returned an instruction telling it whether to invoke the EPH before or after the command is executed, along with pointers to the module and specific entry point that implement the EPH.

The execPropHandlers( ) method loads and executes all EPHs on a given object's properties before or after a given command. The caller (usually the CAF Object Manager) passes-in a pointer to an object, plus the name and version of the command being invoked, and a flag indicating whether the command has been executed yet or not. The execPropHandlers( ) method queries all the properties on the specified object, then loads and executes all appropriately registered EPHs.

The CAF runtime API also includes methods for registering, unregistering, and loading extended object handlers, which are used to instantiate extended objects. Table LII below illustrates the methods in the CAF runtime API for support of extended object handlers.

TABLE LII

HRESULT registerCAFObject([in] LPCTSTR objectNamespace,
          [in] LPCTSTR objectName,
          [in] CLSID clsid);
HRESULT unresigerCAFObject([in] LPCTSTR objectNamespace,
          [in] LPCTSTR objectName);

TABLE LII-continued

HRESULT getCAFObjectCLSID([in] LPCTSTR objectNamespace,
          [in] LPCTSTR objectName,
          [out] CLSID* clsid);
HRESULT getCAFObjectProgID([in] LPCTSTR objectNamespace,
          [in] LPCTSTR objectName,
          [out] LPTSTR* progid);
HRESULT createCAFObject([in] LPCTSTR objectNamespace,
          [in] LPCTSTR objectName,
          [out] LPVOID* ppunk);
HRESULT getCAFClassObject([in] LPCTSTR objectNamespace,
          [in] LPCTSTR objectName,
          [out] LPVOID* ppunk);

The registerCAFObject( ) method registers a new extended object, for instance a new kind of annotation object, with the Common Annotation Framework. It does this by establishing a mapping between the extended object's COM class id, or CLSID, and the object's CAF name and version (objectName and objectNamespace).

The unregisterCAFObject( ) method reverses the effect of registerCAFObject( ), and unregisters the specified extended object from the Common Annotation Framework.

The getCAFObjectCLSID( ) method returns the COM CLSID corresponding to the specified CAF objectName and objectNamespace.

The getCAFObjectProgID( ) method returns the COM "ProgID" string corresponding to the specified CAF object-Name and objectNamespace. The COM ProgID string is mapped by COM to the COM CLSID elsewhere, thus the ProgID can be inferred from the objectName and object-Namespace without having to explicitly include it among the input arguments of registerCAFObject( ).

The createCAFObject( ) method returns a new instance of the extended object specified by the objectNamespace and objectName input arguments.

The getCAFClassObject( ) method returns a new instance of the specified extended object's COM "class factory," which can be used to create new instances of the actual extended object.

The CAF runtime API also includes methods for registering, unregistering, and loading Extended Storage Handlers (ESHs), which are custom code that operate on objects. An extended storage handler is an object which implements an ICAFExtendedStorageHandler interface for a particular object type. Table LIII below illustrates the methods in the CAF runtime API for support of extended storage handlers.

TABLE LIII registerExtendedStorageHandler
Registers an ESH with the framework for a particular object type.
registerExtendedStorageHandler([in] CLSID clsid,
            [in] LPCTSTR objectNamespace,
            [in] LPCTSTR objectName,
            [in] RIID riid,
            [in] BOOL remote)
Arguments
clsid
 Required. The CLSID of the object which implements ICAFExtendedStorageHandler for the specified object type.
namespace
 Required. The namespace of the object type.
objectName
 Required. The name of the object type.
riid
 Required. The IID of the primary interface for the object type.
remote TABLE LIII-continued Required. Indicates whether this ESH supports remote (server-based) storage (TRUE) or local ( based) storage (FALSE). If ESH supports both, it should be registered twice, once with remote=T and once with remote=FALSE.
getExtendedStorageHandlerInfo
Retrieves information for all extended storage handlers that have been registered with the common annotation framework. A list of ESHINFO structs is returned.
getExtendedStorageHandlerInfo([out] ESHINFO** pList,
                               [out] long* pcRec)
typedef struct _ESHINFO{
    CLSID clsid;
    wchar_t objectNamespace[256];
    wchar_t objectName[64];
    IID iid;
} ESHINFO;
Arguments
ppList
    Required. Pointer to a list of ESHINFO structs that will be allocated and populated with all of the ESH information currently registered with the common annotation framework.
pcRec
    Optional. Receives number of records in ppList.
unregisterExtendedStorageHandler
Removes an extended storage handler from the common annotation framework.
unregisterExtendedStorageHandler([in] LPCTSTR objectNamespace,
                               [in] LPCTSTR objectName)
Arguments
namespace
    Required. The namespace of the object type.
objectName
    Required. The name of the object type.

The CAF runtime API also includes methods for registering, unregistering, and loading Invoke methods, which are custom code that operate on objects. Invoke methods differ from extended storage handlers in that Invoke methods typically perform arbitrary processing on core and/or extended objects, while extended storage handlers typically replace basic storage processing on core and/or extended objects. Table LIV below illustrates the methods in the CAF runtime API for support of Invoke methods.

TABLE LIV

```
HRESULT registerInvokeMethod([in] LPCSTR commandNamespace,
                             [in] LPCSTR commandName,
                             [in] VARIANT arguments,
                             [in] LPCTSTR modulePath);
HRESULT unregisterInvokeMethod([in] LPCSTR commandNamespace,
                               [in] LPCSTR commandName);
loadInvokeMethod([in] LPCSTR commandNamespace,
                 [in] LPCSTR commandName,
                 [out] HANDLE* phModule,
                 [out] HANDLE* phProc)
```

The registerInvokeMethod( ) method registers a new custom method with the Common Annotation Framework. The registration arguments include the name and version of the command (commandName and commandNamespace, where commandName also identifies the logical entry point in the implementation module); a list of the number, names, and types of arguments that the new invoke method takes ("arguments"); and the full path to the module that implements the new invoke method.

The unregisterInvokeMethod( ) method unregisters a specified invoke method.

The loadInvokeMethod( ) method loads the module that implements the specified invoke method, and returns a pointer to the module and the appropriate entry point in the module. The CAF Object Manager uses this method to load the appropriate invoke method when it is invoked by a client application via ICAFObjectMgr::invoke( ).

Figure 9:
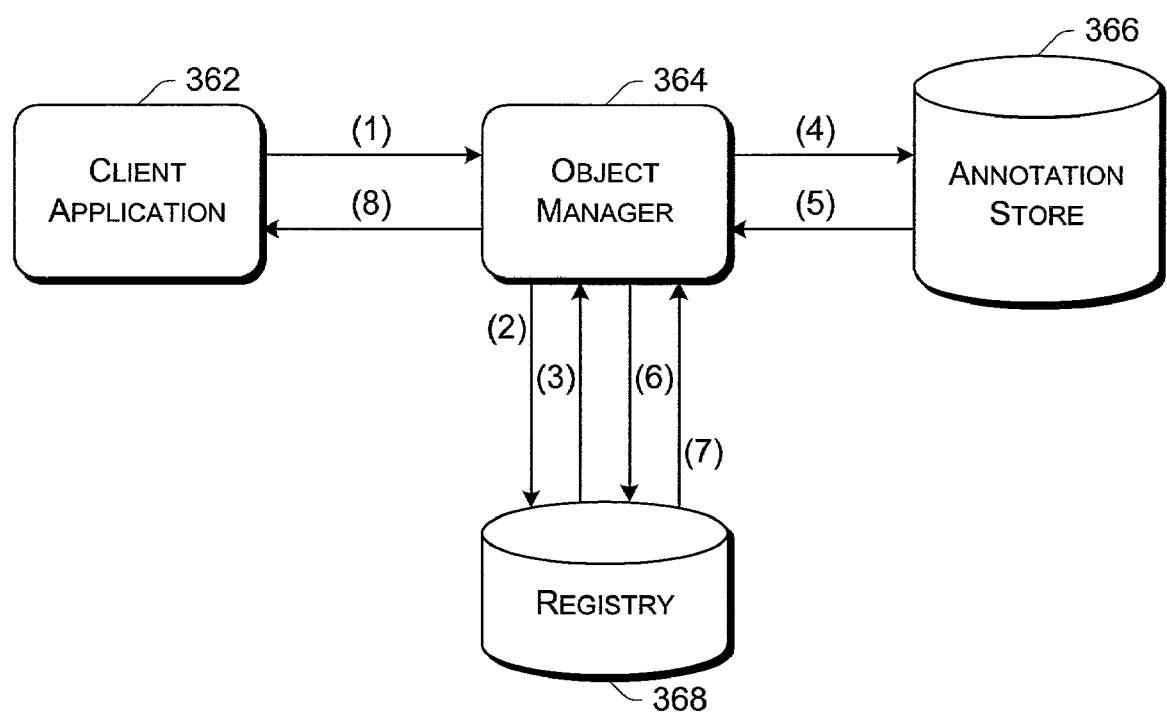
FIG. 9 is a flow diagram illustrating an exemplary call sequence and custom object retrieval in the Common Annotation Framework.

FIG. 9 is a flow diagram illustrating an exemplary call sequence and custom object retrieval in the Common Annotation Framework. A client application 362 initiates (1) a call to object manager 364 to retrieve a new object type from annotation store 366, specifying the appropriate retrieval criteria. Object manager 364 does not know how to resolve the object type, so object manager 364 contacts (2) a registry 368 to resolve the object type to a registered retrieve Extended Storage Method (ESM) of an ESH. Object manager 364 loads (3) the retrieve ESM code module and executes the retrieve ESM to retrieve (4) the contents of objects from annotation store 366. The contents of the retrieved objects are returned (5) to object manager 364, which in turn looks up (6) an Extended Class Factory (ECF) for the object type. The Extended Class Factory for the object type knows how to instantiate and initialize the object type so that it operates as it is defined to. The Extended Class Factory code module is loaded (7) by object manager 364, which executes the loaded Extended Class Factory for the new object type and returns (8) the new objects to client application 362.

Figure 10:
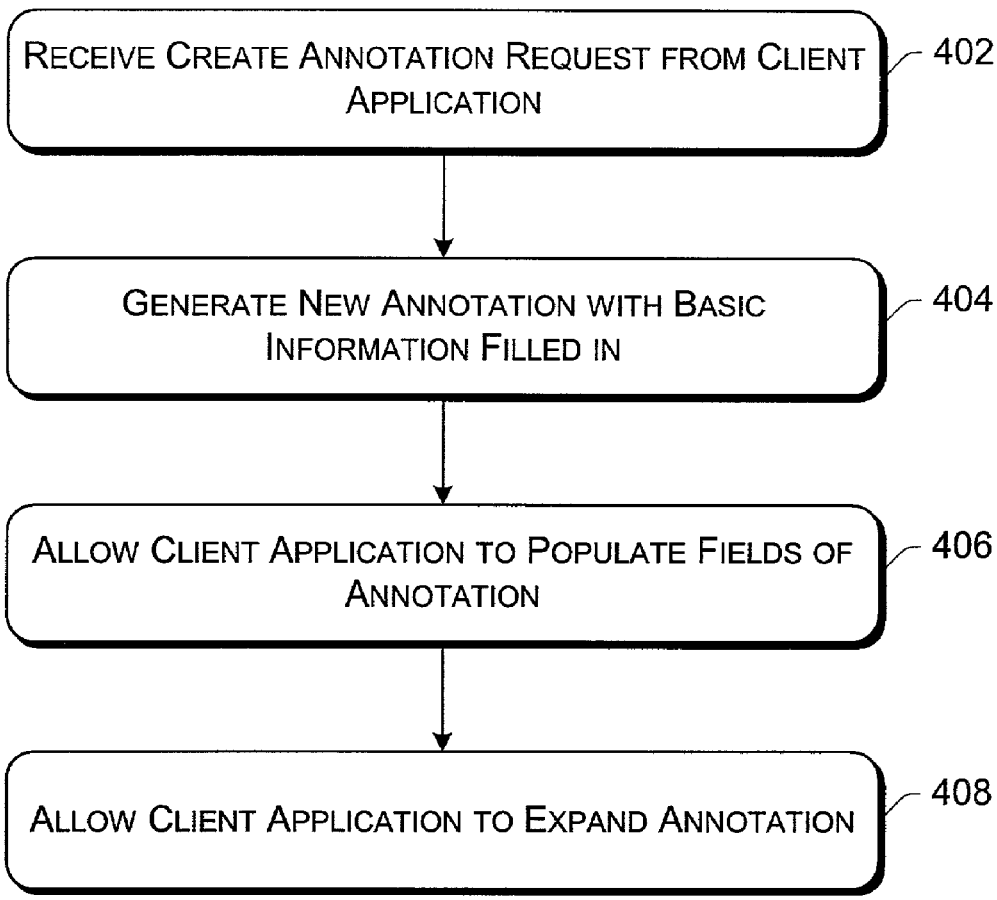
FIG. 10 is a flowchart illustrating an exemplary process for creating an annotation.

FIG. 10 is a flowchart illustrating an exemplary process 400 for creating an annotation in the Common Annotation Framework. Process 400 is carried out by annotation manager 134 of FIG. 4, and may be performed in software. Initially, a request to create an annotation is received from a client application (act 402). An appropriate Extended Storage Handler is loaded and used to generate a new annotation with basic information (e.g., an id and creation date) filled in (act 404). The annotation is returned to the client application, which can then populate the additional fields of the annotation with data (act 406), such as the context as anchor(s), content anchor(s), etc. The client application can also expand the annotation properties with client application-defined data (act 408).

Figure 11:
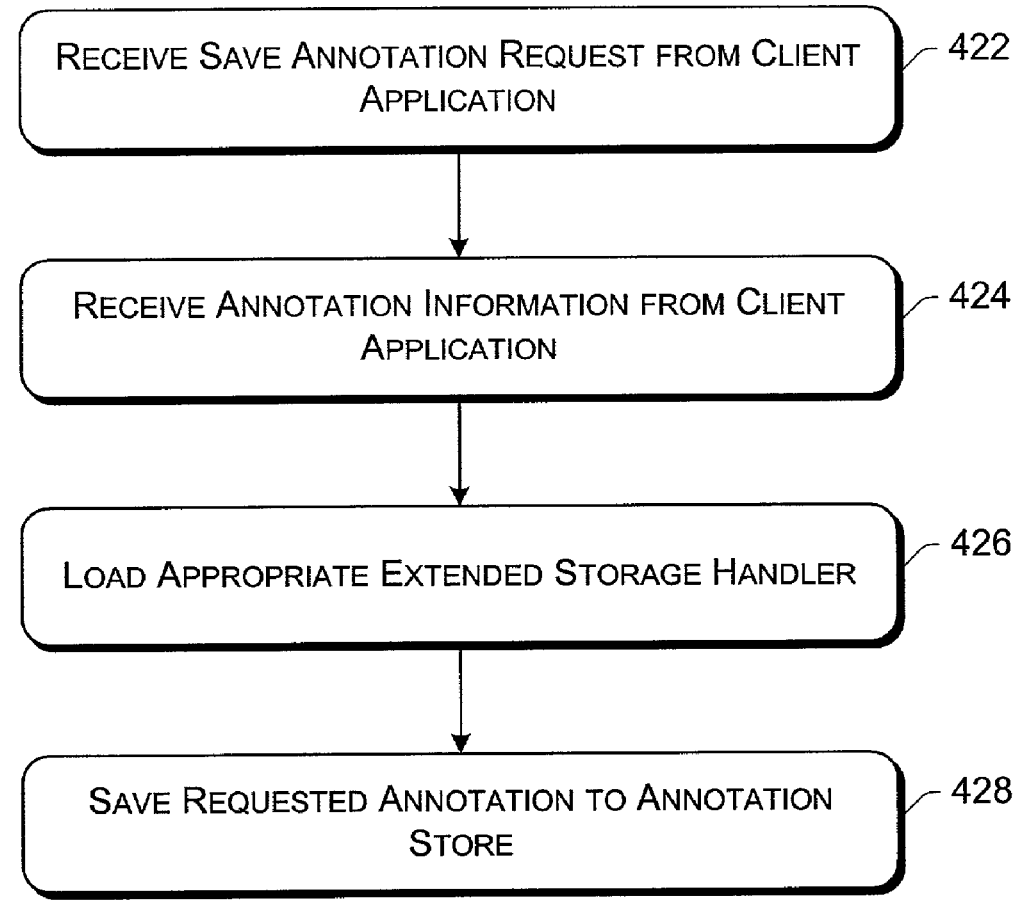
FIG. 11 is a flowchart illustrating an exemplary process for saving an annotation to an annotation store.

FIG. 11 is a flowchart illustrating an exemplary process 420 for saving an annotation to an annotation store in the Common Annotation Framework. Process 420 is carried out by annotation manager 134 of FIG. 4, and may be performed in software. Initially, a request to save an annotation is received from a client application (act 422). The annotation information (e.g., an id of the annotation) is received from the client application (act 424), in response to which annotation manager 134 chooses an appropriate Extended Storage Handler to load and use to store the annotation (act 426), and the Extended Storage Handler stores the annotation into the annotation store to which it is configured to connect (act 428).

Figure 12:
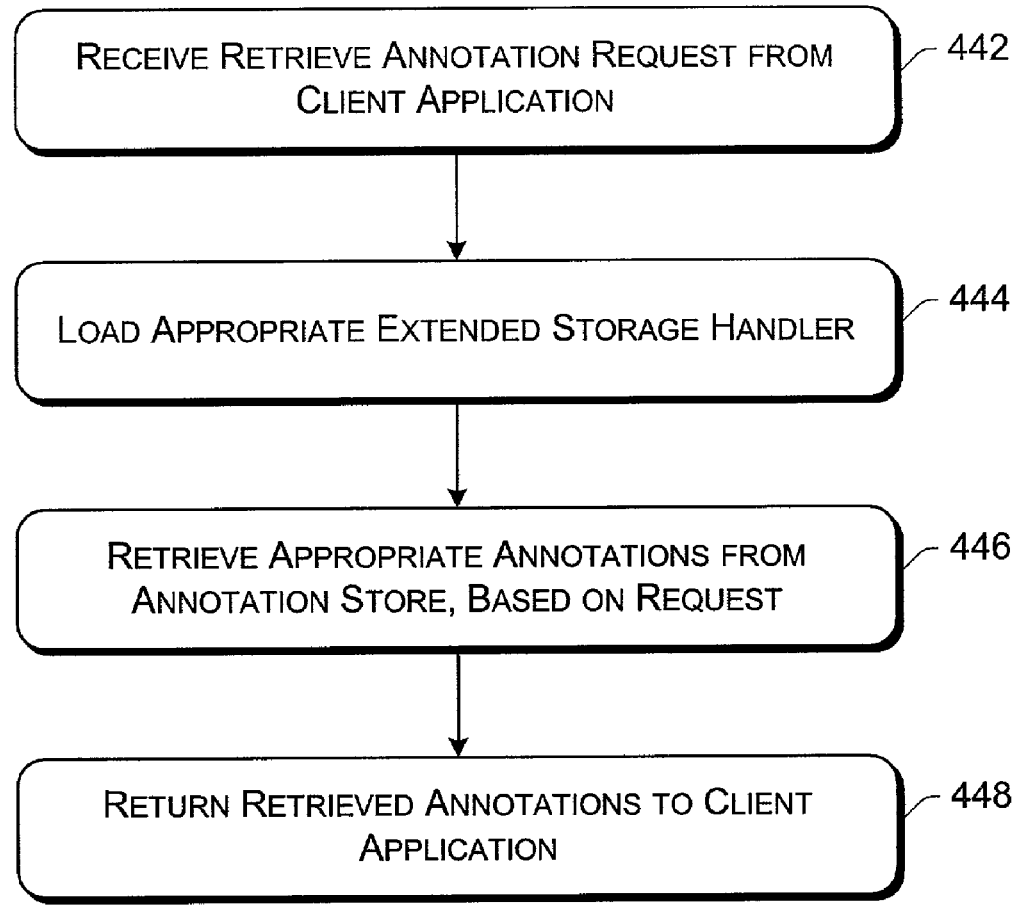
FIG. 12 is a flowchart illustrating an exemplary process for retrieving an annotation from an annotation store.

FIG. 12 is a flowchart illustrating an exemplary process 440 for retrieving an annotation from an annotation store in the Common Annotation Framework. Process 440 is carried out by annotation manager 134 of FIG. 4, and may be performed in software. Initially, a request to retrieve an annotation is received from a client application (act 442). An appropriate Extended Storage Handler is loaded to handle the retrieve operation, based on the characteristics of the retrieval query (act 444). The requested annotation(s) are then retrieved from the annotation store to which the Extended Storage Handler is configured to connect (act 446) and returned to the requesting client application (act 448).

Figure 13:
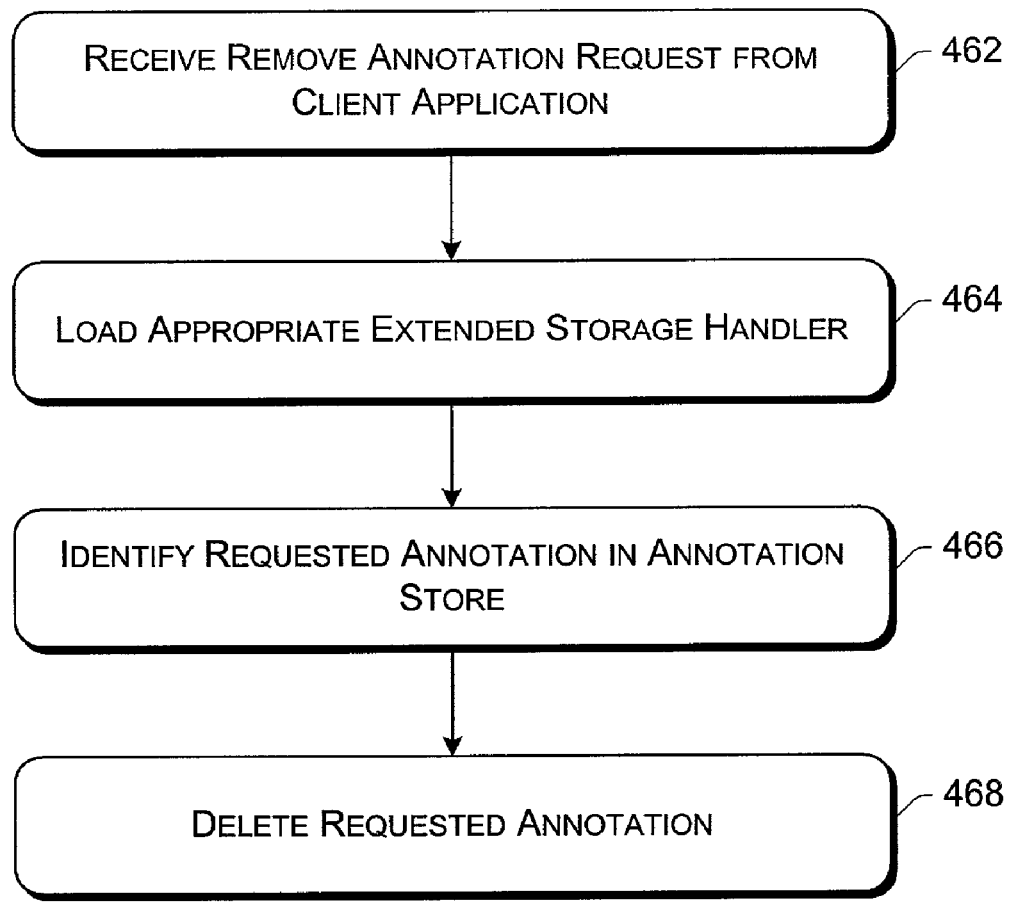
FIG. 13 is a flowchart illustrating an exemplary process for removing an annotation from an annotation store.

FIG. 13 is a flowchart illustrating an exemplary process 460 for removing an annotation from an annotation store in the Common Annotation Framework. Process 460 is carried out by annotation manager 134 of FIG. 4, and may be performed in software. Initially, a request to remove an annotation from the annotation store is received from a client application (act 462). An appropriate Extended Storage Handler is loaded and connects to the annotation store to which it is configured to connect (act 464). The requested annotation is then identified in the annotation store (act 466), and deleted therefrom (act 468).

Figure 14:
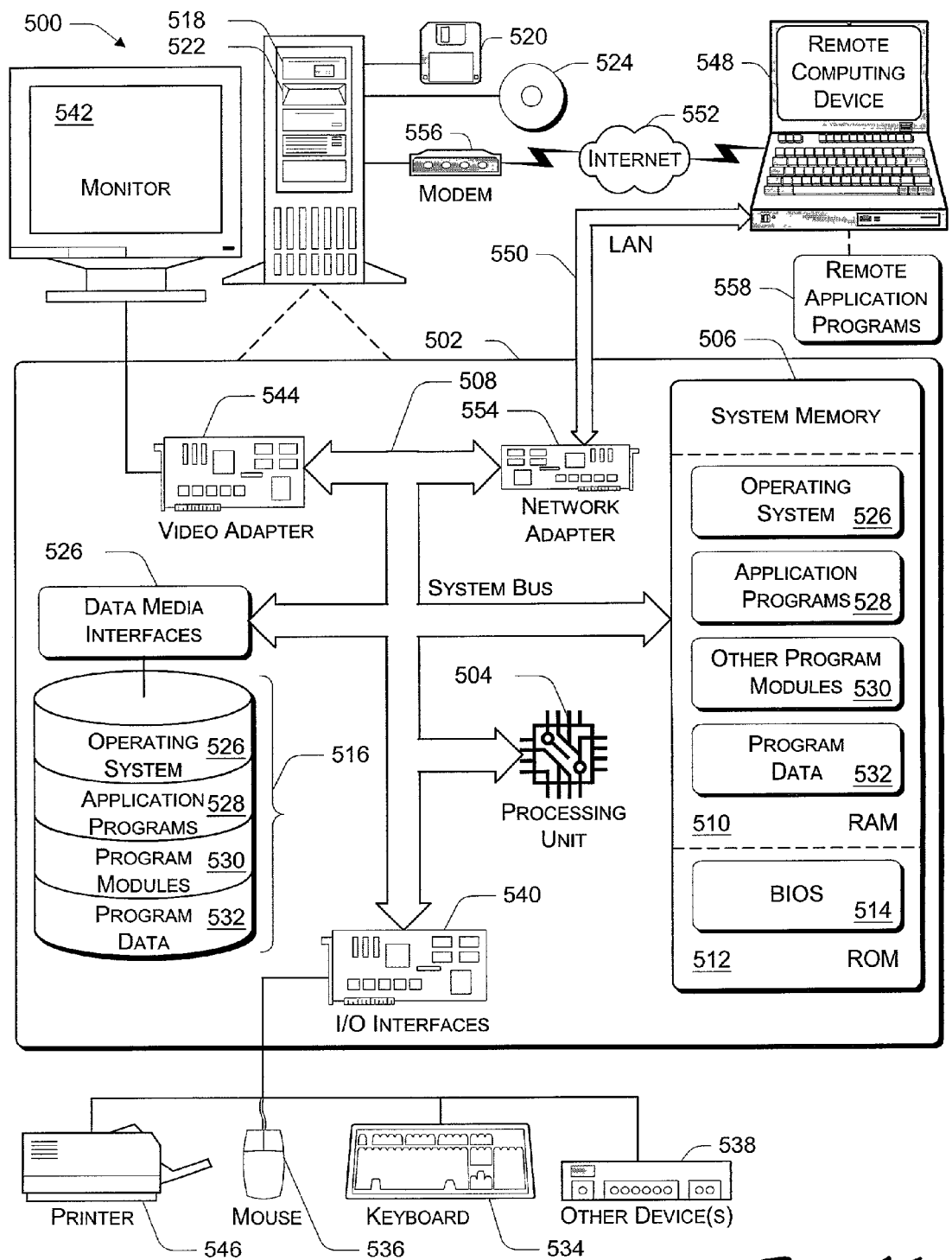
FIG. 14 illustrates a general computer environment, which can be used to implement the Common Annotation Framework described herein.

FIG. 14 illustrates a general computer environment 500, which can be used to implement the Common Annotation Framework described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the exemplary computer environment 500.

Computer environment 500 includes a general-purpose computing device in the form of a computer 502. Computer 502 can implement, for example, a client application 130 of FIG. 4, an annotation manager 134 of FIG. 4, a storage device 138 of FIG. 4, etc. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 14 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A system comprising:
   a client application layer implemented in a computing device including one or more client applications;
   a storage layer including an annotation store;
   a common annotation layer, situated between the client application layer and the storage layer, including an annotation manager; and
   wherein the annotation manager operates to allow the one ore more client applications to store annotations to and retrieve annotations from the annotation store, and wherein the annotation manager further operates to create new property types for the annotations the new property types being identified by the one or more client applications and in addition to existing property types in the client application, so that each of the annotations to be stored in the annotation store can have a property value associated with each of the created new property types.

2. A system as recited in claim 1, wherein the client application layer and the common annotation layer are implemented on two different computing devices.

3. A system as recited in claim 1, wherein the annotation manager further operates to allow the one or more client applications to create annotations for storage in the annotation store and remove annotations from the annotation store.

4. A system as recited in claim 1, wherein the new types of properties property types include new data types.

5. A system as recited in claim 1, wherein the new types of properties property types include new methods.

6. A system as recited in claim 1, wherein each new property type has an associated codebase identified in the annotation, wherein the codebase identifies a location where information can be obtained that describes how to process the new property type.

7. A system as recited in claim 6, wherein the information comprises a software code module.

8. A method implemented in a computing device, comprising:
receiving, from a client application, a request to create an annotation;
generating the annotation; and
allowing the client application to,
add context anchor data to the annotation, wherein the context anchor data identifies a resource and a position in the resource that the annotation pertains to,
add content anchor data to the annotation, wherein the content anchor data identifies data that is annotating the resource, and
extend the types of data that can be stored in the annotation by creating one or more additional new property types to the annotation so that the annotation can have a property value associated with each of the created new property types, wherein the one or more additional new property types are in addition to the existing property types in the client application.

9. A method as recited in claim 8, further comprising allowing the client application to add an additional property that describes an additional method that can be performed on the data stored in the annotation.

10. A method as recited in claim 8, wherein allowing the client application to extend the types of data comprises allowing the client application to extend the types of data that can be stored in the annotation by adding one or more additional properties to the context anchor of the annotation.

11. A method as recited in claim 8, wherein allowing the client application to extend the types of data comprises allowing the client application to extend the types of data that can be stored in the annotation by adding one or more additional properties to the content anchor of the annotation.

12. A method as recited in claim 8, further comprising allowing the client application to add a plurality of context anchors to the annotation, each including different context anchor data.

13. A method as recited in claim 8, further comprising allowing the client application to add a plurality of content anchors to the annotation, each including different content anchor data.

14. A method as recited in claim 8, wherein each of the one or more additional properties includes a codebase that identifies a location where instructions can be obtained that describe how to process the data type in the additional property.

15. A method as recited in claim 14, wherein the instructions comprise a software code module.

16. One or more computer readable media having stored thereon a plurality of instructions that, when executed by one or more processors, causes the one or more processors to:
receive, from a client application, a request to create an annotation;
generate the annotation; and
allow the client application to,
add context anchor data to the annotation, wherein the context anchor data identifies a resource and a position in the resource that the annotation pertains to,
add content anchor data to the annotation, wherein the content anchor data identifies a second resource, wherein the second resource annotates the first resource, and
extend the types of data that can be stored in the annotation by creating one or more additional new property types to the annotation so that the annotation can have a property value associated with each of the created new property types, wherein the one or more additional new property types are in addition to the existing property types in the client application.

17. One or more computer readable media having stored thereon a plurality of instructions that, when executed by one or more processors, causes the one or more processors to:
receive a request to retrieve an annotation;
identify an extended property in the annotation, wherein the extended property is a created new property type identified by one or more client applications, wherein the created new property types is in addition to existing property types in the client application;
identify a codebase corresponding to the extended property, wherein the codebase identifies a location where information can be obtained that describes how to process the contents of the extended property; and
process the contents of the extended property in accordance with the information.

18. One or more computer readable media as recited in claim 17, wherein the information comprises a software code module.

19. One or more computer readable media as recited in claim 17, wherein the contents of the extended property comprise data.

20. One or more computer readable media as recited in claim 17, wherein the contents of the extended property comprise a method.

21. One or more computer readable media as recited in claim 17, wherein the instructions to receive the request comprise instructions that cause the one or more processors to receive, by a client application, a request from a user to retrieve an annotation.

22. One or more computer readable media as recited in claim 17, wherein the instructions to receive the request comprise instructions that cause the one or more processors to receive, by an annotation manager, a request from a client application to retrieve an annotation.

23. One or more computer readable media as recited in claim 17, wherein the plurality of instructions comprise a client application.

24. One or more computer readable media as recited in claim 17, wherein the plurality of instructions comprise an annotation manager.

25. One or more computer readable media as recited in claim 17, wherein the codebase comprises a uniform resource locator (URL) of the location.

26. A system implemented in a computing device implementing a Common Annotation Framework comprising:
a plurality of annotation objects, each configured to store data regarding a resource being annotated and data annotating the resource; and
an object manager configured to allow a client application to access he plurality of annotation objects, and further configured to allow the client application to create new property types of the plurality of annotation objects with client application-defined data and in addition to existing property types in the client application, so that the annotation objects can have a property value associated with each of the created new property types.

27. A system as recited in claim 26, wherein the object manager includes a create method interface that allows the client application to request that an annotation object be created.

28. A system as recited in claim 26, wherein the object manager includes a save method interface that allows the client application to request that an annotation object be saved into an annotation store.

29. A system as recited in claim 26, wherein the object manager includes a remove method interface that allows the client application to request that an annotation object be removed form an annotation store.

30. A system as recited in claim 26, wherein the object manager includes a retrieve method interface that allows the client application to request that an annotation object be retrieved from an annotation store.

31. A system as recited in claim 26, wherein the object manager includes an invoke method interface that allows the client application to request that a client application-defined method be executed by the object manager.

32. A system as recited in claim 26, wherein the object manager includes a codebase method interface that allows another client application to obtain an identifier of a location of instructions regarding how to process the client application-defined data.

33. A system as recited in claim 26, wherein the client application-defined data comprises methods.

34. A system as recited in claim 26, wherein the client application-defined data comprises properties.

35. A system as recited in claim 26, wherein each of the plurality of annotation objects exposes an annotation interface that allows the client application to access a pointer to an anchor object that identifies a location of the resource that the annotation object pertains to.

36. A system as recited in claim 26, wherein each of the plurality of annotation objects exposes an annotation interface that allows the client application to access a pointer to an anchor object that identifies a location of another resource that contains the data annotating the resource.

37. A system as recited in claim 26, wherein the Common Annotation Framework further comprises a set object that allows selected ones of the plurality of annotation objects to be grouped together.

38. A system as recited in claim 26, wherein the Common Annotation Framework further comprises an event object that includes data to be returned to the client application in an asynchronous manner.

39. A system as recited in claim 26, wherein the Common Annotation Framework further comprises an anchor object that contains the data regarding the resource being annotated.

40. A system as recited in claim 26, wherein the Common Annotation Framework further comprises an anchor object that contains the data annotating the resource.

41. A system as recited in claim 26, wherein the Common Annotation Framework further comprises a property object that contains the client application-defined data.

42. A method implemented in a computing device comprising:
   receiving a request to retrieve, from an annotation store, one or more annotation objects; and
   implementing one or more of a plurality of handlers as needed to respond to the request, the plurality of handlers including an extended property handler, extended object handler, and an extended storage handler, wherein the extended property handler is configured to create new property types identified by a client application to the one or more annotation objects so that annotation objects can have a property value associated with each of the created new property types, wherein the one or more additional new property types are in addition to the existing property types in the client application.

43. A method as recited in claim 42, wherein the extended property handler operates on annotation object properties.

44. A method as recited in claim 42, wherein the extended property handler operates on anchor object properties.

45. A method as recited in claim 42, wherein the extended storage handler operates on objects from the annotation store.

* * * * *